(12) United States Patent
Kurogi et al.

(10) Patent No.: US 8,702,160 B2
(45) Date of Patent: Apr. 22, 2014

(54) VEHICLE-BODY STRUCTURE OF VEHICLE AND MANUFACTURING METHOD OF THE SAME

(75) Inventors: Osamu Kurogi, Hiroshima (JP); Tsuyoshi Sugihara, Hiroshima (JP); Kohya Nakagawa, Hiroshima (JP); Kuniaki Nagao, Hiroshima (JP); Sakayu Terada, Hiroshima (JP); Miho Kowaki, Hiroshima (JP); Akira Iyoshi, Hiroshima (JP); Shigeaki Watanabe, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/600,063

(22) Filed: Aug. 30, 2012

(65) Prior Publication Data

US 2013/0049391 A1 Feb. 28, 2013

(30) Foreign Application Priority Data

Aug. 31, 2011 (JP) ................................. 2011-189058

(51) Int. Cl.
*B62D 25/00* (2006.01)
*B62D 25/02* (2006.01)
*B62D 25/08* (2006.01)

(52) U.S. Cl.
USPC ......... 296/205; 296/30; 296/209; 296/203.03

(58) Field of Classification Search
USPC ............ 296/29, 30, 205, 209, 187.02, 203.03
See application file for complete search history.

(56) References Cited

U.S. PATENT DOCUMENTS

| | | | | |
|---|---|---|---|---|
| 4,252,364 A | * | 2/1981 | Toyama et al. | 296/203.01 |
| 5,131,710 A | * | 7/1992 | Kamiguchi et al. | 296/76 |
| 5,362,120 A | * | 11/1994 | Cornille, Jr. | 296/203.01 |
| 5,635,562 A | * | 6/1997 | Malcolm | 525/108 |
| 6,237,304 B1 | * | 5/2001 | Wycech | 52/847 |
| 7,140,668 B2 | * | 11/2006 | Wesch et al. | 296/187.02 |
| 8,403,390 B2 | * | 3/2013 | Rich et al. | 296/29 |

FOREIGN PATENT DOCUMENTS

| | | |
|---|---|---|
| JP | 59-182472 U | 12/1984 |
| JP | 60-097673 U | 7/1985 |
| JP | 2011-201425 A | 10/2011 |
| JP | 2011-255815 A | 12/2011 |
| JP | 2012-017084 A | 1/2012 |

* cited by examiner

*Primary Examiner* — Dennis Pedder
(74) *Attorney, Agent, or Firm* — Studebaker & Brackett PC

(57) ABSTRACT

In a frame having a closed-section portion which is formed by joining a first member having a U-shaped section and a second member having a flat-plate shape, a bulkhead is provided in the closed-section portion as a reinforcing member, flanges of the bulkhead and the first and second members are joined with a rigid joint portion where they are joined by a spot welding and a flexible joint portion where they are joined via a damping member. Thereby, transmission of vibrations can be properly restrained, improving the rigidity of the portion having the closed-section portion.

5 Claims, 21 Drawing Sheets

Rigid Joint Model A

Rigid-Flexible Combined
Joint Model B

VEHICLE-BODY STRUCTURE OF VEHICLE AND MANUFACTURING METHOD OF THE SAME

BACKGROUND OF THE INVENTION

The present invention relates to a vehicle-body structure of a vehicle and a manufacturing method of the same.

Vehicles, such as automotive vehicles, are required to increase the rigidity of a vehicle body in order to improve the comfortable ride and the safety. Japanese Utility Model Laid-Open publication Nos. 59-182472 and 60-097673, for example, disclose structures for increasing the rigidity in which a reinforcing member is provided in a closed-section portion formed by a vehicle-body forming member.

The first one of the above-described patent publications discloses the structure in which the bulkhead is arranged in a bamboo-joint shape in the closed-section portion of the side sill formed by the side sill outer and the side sill inner, and the flanges formed at its periphery are joined to the inner faces of the side sill outer and the side sill inner by both spot welding and an adhesive agent.

The second one of the above-described patent publications discloses the structure in which the bulkhead is arranged in the bamboo-joint shape in the closed-section portion of the front suspension member formed by the upper member and the lower member, and the flanges formed at its periphery are joined to the inner face of the upper member by an adhesive agent for structure.

According to the structures disclosed in the above-described patent publications, however, there is a concern that while improvement of the rigidity is achieved, vibrations occurring at various portions of the vehicle may not be effectively restrained from transmitting to the inside of the vehicle compartment in some cases depending on arrangement positions, shapes, and the like. Therefore, further improvement of the vehicle-body structure has been required in order to properly restrain vibration transmission to passengers for improving the comfortable ride and reducing noises.

SUMMARY OF THE INVENTION

An object of the present invention is to provide a vehicle-body structure of a vehicle or a manufacturing method of the same which can properly restrain the vibration transmission, thereby improve the comfortable ride and reduce the noises of the vehicle, ensuring the sufficient rigidity of the vehicle-body structure.

According to the present invention, there is provided a vehicle-body structure of a vehicle, comprising at least one vehicle-body forming member forming a closed-section portion, and a reinforcing member provided in the closed-section portion of the vehicle-body forming member and joined to the vehicle-body forming member, wherein a joint portion of the vehicle-body forming member and the reinforcing member includes a rigid joint portion where the vehicle-body forming member and the reinforcing member are joined with a direct contact thereof and a flexible joint portion where the vehicle-body forming member and the reinforcing member are joined via a damping member provided therebetween.

According to the present invention, since the reinforcing member is provided in the closed-section portion formed by a single vehicle-body forming member made in a hollow-tube shape, for example, or plural vehicle-body forming members joined together, the rigidity of the vehicle-body forming member(s) and a portion of the vehicle body formed by the vehicle-body forming member(s) can be improved, so that any deformation of that portion, collapse of the closed-section portion, or the like can be properly restrained. In this case, since the joint portion of the vehicle-body forming member and the reinforcing member includes the rigid joint portion by using welding, bolt fastening or the like as well as the flexible joint portion by using the damping member, the vehicle-body forming member and the reinforcing member can be joined firmly with the rigid joint portion, thereby improving the rigidity, and vibrations of the vehicle-body forming member(s) can be properly reduced by the damping member provided at the flexible joint portion. Thereby, the above-described vibration transmission can be properly restrained, ensuring the sufficient rigidity of the vehicle-body structure, so that the comfortable ride can be improved and the noises can be reduced. Herein, the present invention may not require any additional members to restrain the vibration transmission, so that the above-described effects can be advantageously provided, avoiding any improper weight increase of the vehicle body or the like.

According to an embodiment of the present invention, the damping member is a viscoelastic member having physical properties which fall within a range enclosed by six coordinate points: (1, 0.4), (2, 0.2), (10, 0.1), (2000, 0.1), (10000, 0.2) and (10000, 0.4) in an X-Y coordinate system with X axis of the storage modulus and Y axis of the loss factor, or a range exceeding the loss factor of 0.4. Thereby, since the viscoelastic member is used as the damping member and the storage modulus and the loss factor as its physical properties are specified as any values falling within the specified range which has been confirmed as an effective range capable of providing the vibration-damping effect, the above-described damping effect of vibrations of the vehicle-body forming member(s) according to the present invention can be surely provided.

According to another embodiment of the present invention, the reinforcing member is a bulkhead having at least one flange portion provided at a periphery thereof, and the joint portion is provided at the flange portion. Thereby, the above-described effects of rigidity improvement and vibration damping by the joint portions can be surely provided as an appropriate concrete structure.

According to another embodiment of the present invention, the bulkhead comprises two sheets of partition face portion which partition the closed-section portion of the vehicle-body forming member and a connection portion which connects the two sheets of partition face portion. Thereby, the rigidity-improvement effect by the bulkhead can be provided over a properly-wide range of the vehicle-body forming member(s) forming the closed-section portion, and the number of parts can be reduced by half, compared with a case in which a pair of bulkheads are arranged at two adjacent positions in the closed-section portion respectively, so that parts control or assembling efficiency can be improved.

According to another embodiment of the present invention, the rigid joint portion and the flexible joint portion are provided at one flange portion of the bulkhead. Thereby, the joint strength of the bulkhead to the vehicle-body forming member can be ensured by the joint portion of the flange, and the vibration-damping effect can be provided.

According to another embodiment of the present invention, the closed-section portion of the vehicle-body forming member is comprised of two vehicle-body forming members. Thereby, the above-described effects can be provided at a specified portion where the closed-section portion is formed by the two vehicle-body forming members, such as a side sill, a pillar, or a roof rail.

According to anther aspect of the present invention, there is provided a manufacturing method of a vehicle-body structure of a vehicle which comprises at least one vehicle-body forming member forming a closed-section portion and a reinforcing member provided in the closed-section portion of the vehicle-body forming member and joined to the vehicle-body forming member, the method comprising a step of joining the vehicle-body forming member and the reinforcing member, wherein the joining step includes a rigid joining step of joining the vehicle-body forming member and the reinforcing member with a direct contact thereof and a flexible joining step of joining the vehicle-body forming member and the reinforcing member via a damping member provided therebetween. A vehicle-body structure of a vehicle manufactured by this method can provide the same effects as described above for the present invention.

Other features, aspects, and advantages of the present invention will become apparent from the following description which refers to the accompanying drawings.

DETAILED DESCRIPTION OF THE INVENTION

Firstly, the results of simulation which has been conducted for a structure specified in claims of the present invention will be described prior to descriptions of a concrete application structure to a vehicle body.

Figure 1A:
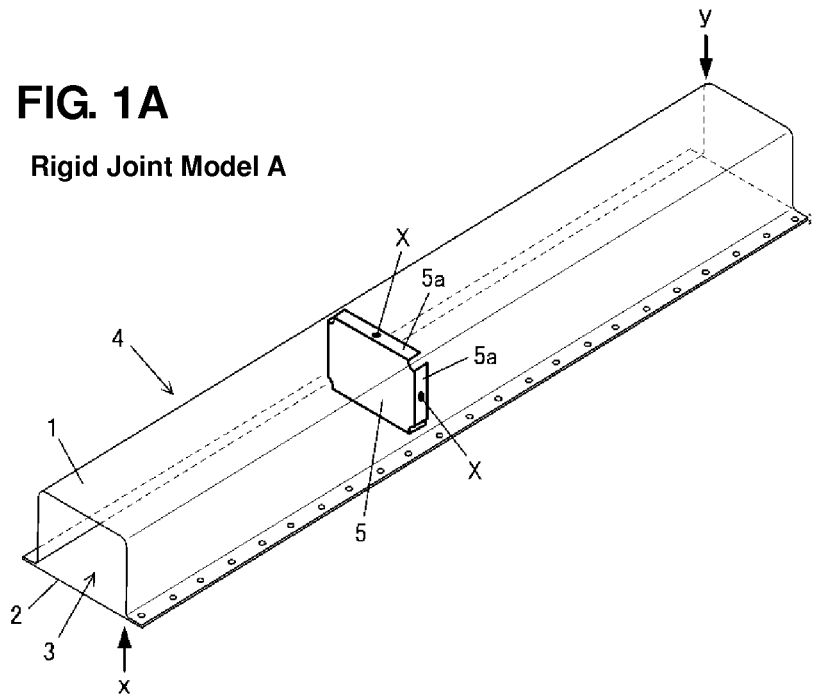
FIGS. 1A and 1B are diagrams showing simulation models according to an embodiment of the present invention.
Figure 1B:
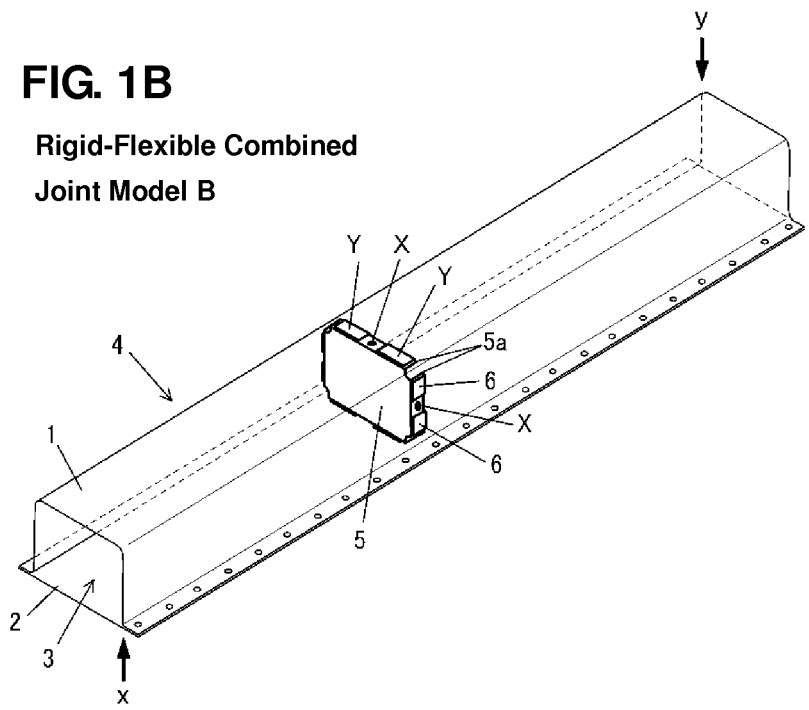

FIGS. 1A and 1B show a rigid joint model A and a rigid-flexible combined joint model B which have been used as simulations, respectively. In each model, a first member 1 having a U-shaped section and a second member 2 having a flat-plate shape are used as vehicle-body forming members, which form a hollow frame 4 having a closed-section portion 3 with a rectangular section by joining both-side end portions of the second member 2 to flanges formed at both sides of the first member 1.

A bulkhead 5 is provided in the closed-section portion 3 of the frame 4. The bulkhead 5 is fixed in the frame 4 by joining flanges 5a . . . 5a formed at its four peripheral sides to inner faces of the first and second members 1, 2, respectively.

In the rigid joint model A shown in FIG. 1A, the flanges 5a . . . 5a of the bulkhead 5 are joined to the first and second members 1, 2 at each central portion thereof by spot welding. In the rigid-flexible combined joint model B shown in FIG. 1B, the flanges 5a . . . 5a of the bulkhead 5 are joined to the inner faces of the first and second members 1, 2 at each central portion thereof by spot welding and also at each both sides thereof via damping members 6, 6. Herein, the above-described joint portion with the spot welding constitutes a rigid joint portion X and the above-described joint portion with the damping member 6 constitutes a flexible joint portion Y.

Herein, while the model B equipped with both the rigid joint portion X and the flexible joint portion Y has a higher rigidity than the model A equipped with only the rigid joint portion X and therefore there exists a difference in the resonance frequency between the models A, B, in order to compare these models properly by making their resonance frequency uniform, the area of the rigid joint portion X of the model A is set to be slightly larger than that of the rigid joint portion X of the model B. Further, the damping member 6 provided at the flexible joint portion Y is comprised of a viscoelastic member which has the loss factor of 0.4 and the storage modulus of 200 MPa (20° C., 30 Hz).

Figure 2:
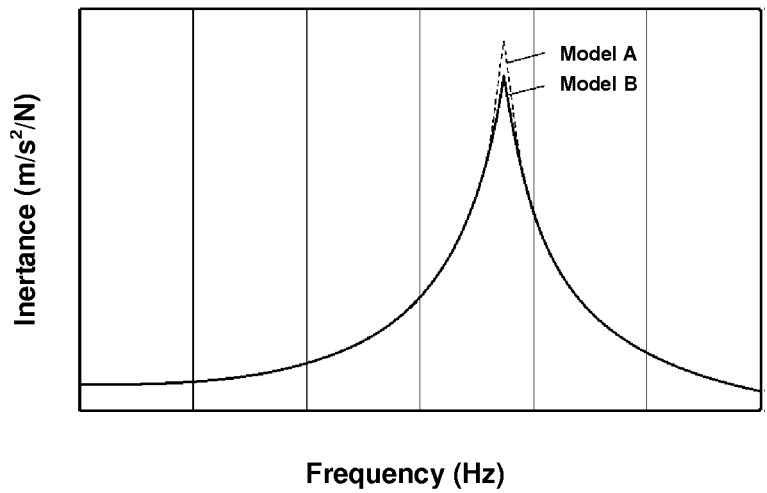
FIG. 2 is a frequency-characteristic graph of the inertance showing simulation results.

FIG. 2 shows simulation results. Herein, in each of the models A, B, a specified corner portion of the closed-section portion at one end thereof is set as an exciting point x and a corner portion of the closed-section portion at the other end thereof which is positioned diagonally to the above-described specified corner portion is set as a responsive point y. FIG. 2 shows a comparison of the respective inertance (a magnitude of an acceleration amplitude per an exciting force: $m/s^2/N$).

As apparent from FIG. 2, a peak value of the inertance of the rigid-flexible combined joint model B is lower than that of the rigid joint model A. Accordingly, it is shown that the amount of damping occurring in the process of vibration transmission from the exciting point x to the responsive point y becomes larger with providing the flexible joint portion Y.

Figure 3:
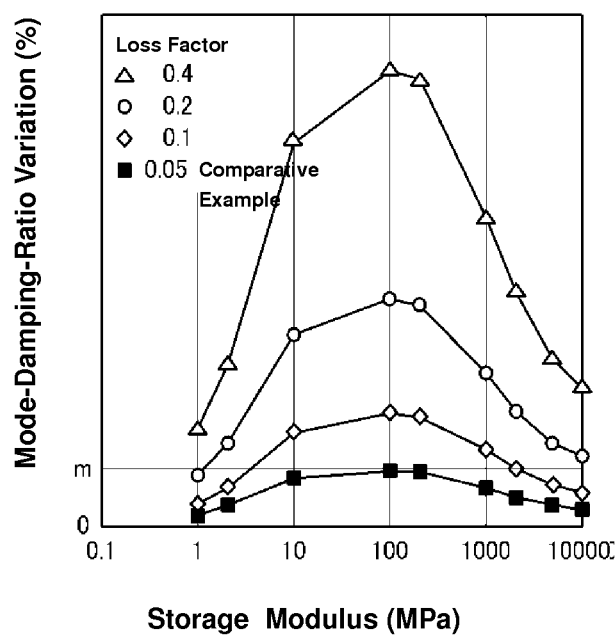
FIG. 3 is a mode-damping-ratio variation characteristic graph for the storage modulus and the loss factor.

FIG. 3 shows simulation results of a mode-damping-ratio variation characteristic for the storage modulus and the loss factor when using plural viscoelastic members having different values of the loss factor as the damping member 6 in the above-described rigid-flexible combined joint model B. Herein, the damping member having the loss factor of 0.05 is a comparative sample, which is an adhesive agent for structure generally used in the vehicle body.

As apparent from this figure, it is shown that the mode-damping-ratio variation in a case of using the viscoelastic member is greater than that in a case of using the general adhesive agent for structure (the loss factor of 0.05) in a whole area of the storage modulus, thereby damping the vibration more easily. In particular, it is shown that the mode-damping-ratio variation becomes greater as the loss factor becomes greater, and that the mode-damping-ratio variation becomes the maximum when the storage modulus is 100 MPa regardless of the value of the loss factor.

Figure 4:
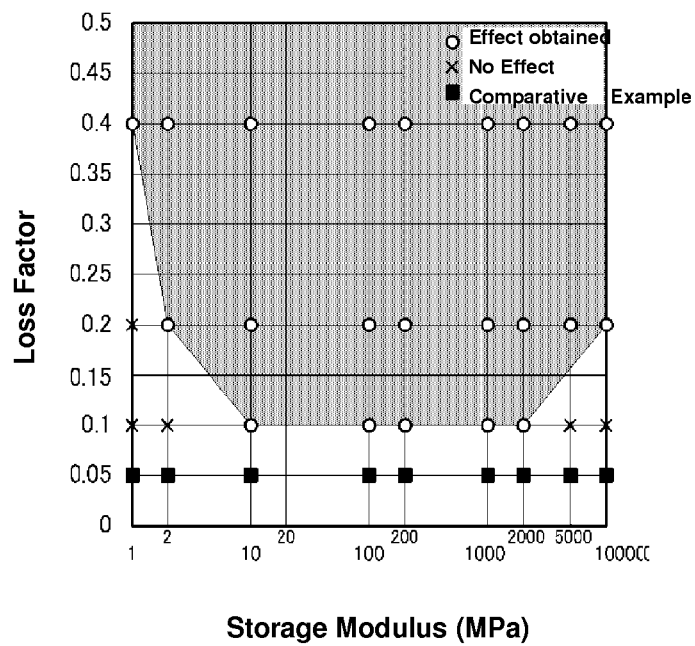
FIG. 4 is a graph showing an effective range obtained based on the results shown in FIG. 3.

FIG. 4 shows relationships between the loss factor and the storage modulus which can substantially obtain the damping effect in a case in which the viscoelastic member is used as the damping member 6 from the simulation results of FIG. 3. In this figure, it is determined that the effect can be obtained in a case in which the mode-damping-ratio variation is a threshold m or greater shown in FIG. 3, while no effect can be obtained in a case in which the mode-damping-ratio variation is less than the threshold m.

Consequently, it has been found that the damping effect can be obtained in substantially a range enclosed by six coordinate points: (1, 0.4), (2, 0.2), (10, 0.1), (2000, 0.1), (10000, 0.2) and (10000, 0.4) in an X-Y coordinate system with X axis of the storage modulus and Y axis of the loss factor, and a range exceeding the loss factor of 0.4.

Next, preferred embodiments in which the structure of the present invention is applied to the vehicle body will be described.

Figure 5:
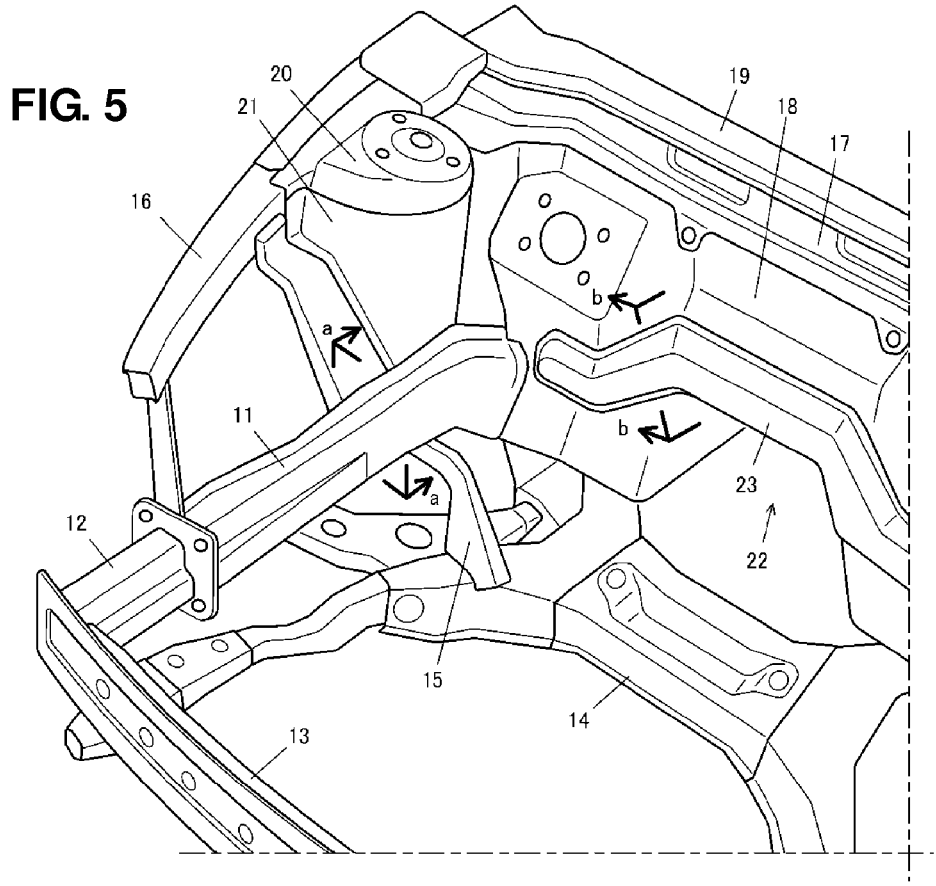
FIG. 5 is a perspective view of a vehicle-body front portion to which first and second embodiments of the present invention are applied.

FIG. 5 shows a structure of a front portion of the vehicle body to which first and second embodiments are applied, in which there are provided some members constituting a frame of the vehicle-body front portion around an engine room which comprise right and left front side frames 11, 11 extending longitudinally (only one of them is illustrated in the figures, and likewise in the followings), bumper stays 12, 12 extending forward from respective front end portions of the front side frames 11, 11, a bumper reinforcement 13 interconnecting both front end portions of the bumper stays 12, 12 and extending in a vehicle width direction, a suspension cross member 14 extending in the vehicle width direction in back of the bumper reinforcement 13, right and left member brackets 15, 15 respectively interconnecting right and left end portions of the suspension cross member 14 and the front side frames 11, 11, and apron reinforcements 16, 16 extending longitudinally above the front side frames 11, 11.

A dash upper panel 17 and a dash lower panel 18, which partition an engine room from a vehicle compartment, are provided in back of the engine room. A cowl panel 19 is provided to extend in the vehicle width direction above the dash upper panel 17. Further, a suspension tower which is formed by a suspension housing upper 20 and a suspension housing lower 21 is provided at each corner portion of a rear portion of the engine room where a side end portion of the dash lower panel 18 and a rear end portion of the apron reinforcement 16 cross each other.

A central portion of a lower side of the dash lower panel 18 is cut off upwardly, which forms an inlet portion of a tunnel 22. A dash lower reinforcement 23 which has substantially a gate shape in an elevational view and substantially a U-shaped section is provided along the inlet portion of the tunnel 22.

The first embodiment is applied to the above-described front side frame 11 in the front portion of the vehicle body described above. Hereafter, this first embodiment will be described.

Figure 6:
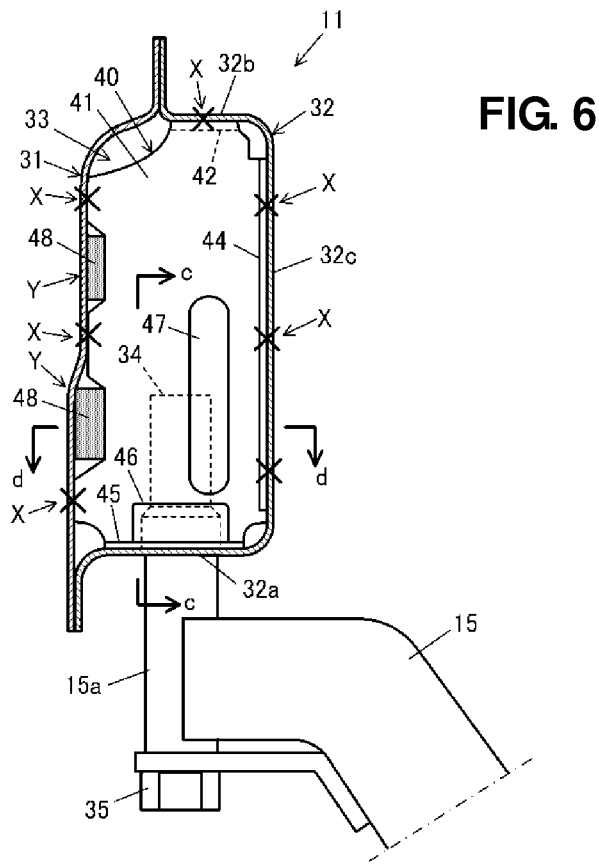
FIG. 6 is a sectional view of the first embodiment taken along line a-a of FIG. 5.
Figure 7:
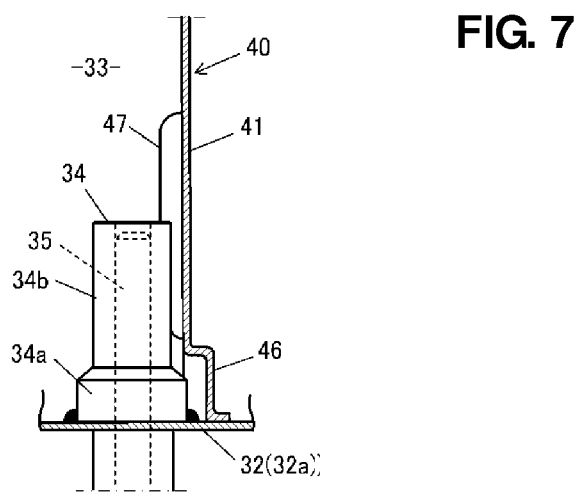
FIG. 7 is a sectional view of the first embodiment taken along line c-c of FIG. 6.
Figure 8:
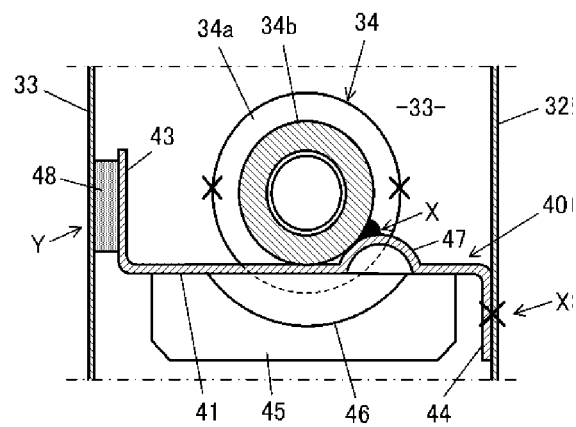
FIG. 8 is a sectional view of the first embodiment taken along line d-d of FIG. 6.

As shown in FIGS. 6-8, the front side frame 11 comprises a front side frame outer panel (hereafter, referred to as "outer panel") 31 having a flat-plate shape and a front side frame inner panel (hereafter, referred to as "inner panel") 32 having a U-shaped section, which form a hollow structure having a closed-section portion 33 extending longitudinally by joining respective upper flanges and respective lower flanges.

In the above-described closed-section portion 33, a nut 34 is welded onto a lower horizontal face portion 32a of the inner panel 32. A bolt 35 which is inserted into a sleeve 15a attached to a tip of the member bracket 15 passes through a hole (not illustrated) formed at the lower horizontal face portion 32a of the inner panel 32, and the above-described nut 34 is fastened to the bolt 35. Thus, the member bracket 15 is connected to the front side frame 11.

Further, a bulkhead 40, as a reinforcing member to partition the closed-section portion 33 into a front portion and a rear portion, is provided in the closed-section portion 33 of the front side frame 11 at a specified position which is near and in front of the welding portion of the nut 34.

Figure 9:
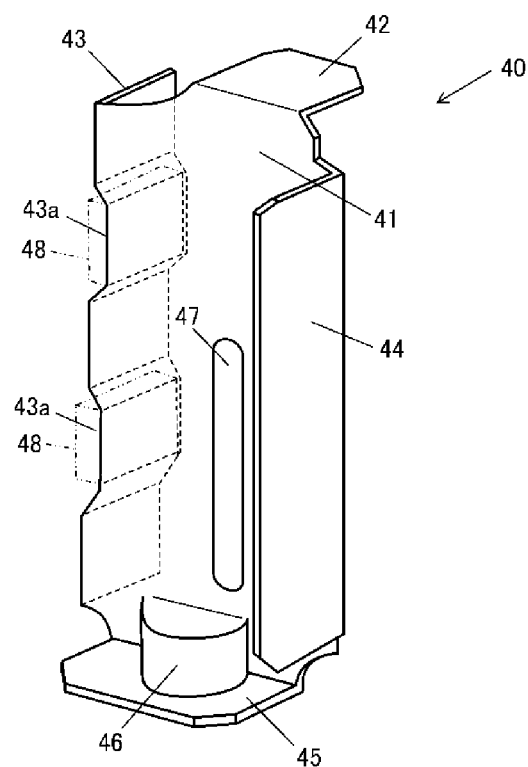
FIG. 9 is a perspective view of a reinforcing member according to the first embodiment.

The bulkhead 40 comprises, as shown in FIG. 9, a partition face potion 41 which partitions the closed-section portion 33, first and second flange portions 42, 43 which are respectively provided at its upper side portion and its vehicle-outside side portion and extend rearward, and third and fourth flange portions 44, 45 which are provided at a vehicle-inside side portion and a lower side portion of the partition face portion 41 and extend forward. Seat portions 43a, 43a are formed at the second flange portion 43 in a recess shape so as to accommodate viscoelastic members 48, 48 therein, which will be described specifically.

Further, at a corner portion where a lower portion of the partition face portion 41 and the fourth flange portion 45 cross each other is provided a protruding portion 46 which is of substantially a semicircular shape in a plan view and protrudes forward in order to avoid any interference with a large-diameter portion 34a of a lower end portion of the nut 34. Also, another protruding portion 47 which extends vertically and protrudes rearward is formed above the protruding portion 46 in order to weld an upper portion 34b of the nut 34.

The first and third flange portions 42, 44 of the bulkhead 40 are joined to inner faces of an upper horizontal face portion 32b and a vertical face portion 32c of the inner panel 32 by spot welding. The second flange portion 43 of the bulkhead 40 faces to an inner face of the outer panel 31. The viscoelastic members 48, 48 as the vibration damping member are arranged in the seat portions 43a, 43a of the second flange portion 43. One-side faces of the viscoelastic members 48, 48 adhere to the seat portions 43a, 43a, and the other-side faces of them adhere to the inner face of the outer panel 31. Thus, the second flange portion 43 of the bulkhead 40 is joined to the outer panel 31 via the viscoelastic members 48, 48, and also joined to the inner face of the outer panel 31 by spot welding.

Moreover, the protruding portion 47 and the upper portion 34b of the nut 34 are joined to each other by welding. This welding portion to the nut upper portion 34b and the above-described spot welding portions constitute the rigid joint portions X . . . X, and the joint portions via the viscoelastic members 48, 48 constitute the flexible joint portions Y, Y.

According to the structure of the front side frame 11 of the first embodiment, the rigidity of the frame 11 can be improved by the bulkhead 40 provided in the closed-section portion 33, so that any deformation of the frame 11, collapse of the closed-section portion 33, and the like can be restrained.

In this case, since the first and third flange portions 42, 44 of the bulkhead 40 are joined to the upper horizontal face portion 32b and the vertical face portion 32c of the inner panel 32, the partition face portion 41 is joined to the lower horizontal face portion 32a of the inner panel 32 via the nut 34 by spot welding, respectively, and the second flange portion 43 is flexibly joined to the outer panel 31 via the viscoelastic members 48, 48, the bulkhead 40 can be firmly joined to the inner panel 32 with the rigid joint portion, thereby providing the above-described rigid-improvement effect, and the vibration of the front side frame 11 can be damped with the flexible joint portion, thereby restraining the vibration transmission to passengers in the vehicle compartment.

Herein, the front side frame 11 according to the first embodiment is manufactured by steps shown in FIGS. 10A-10D.

Figure 10A:
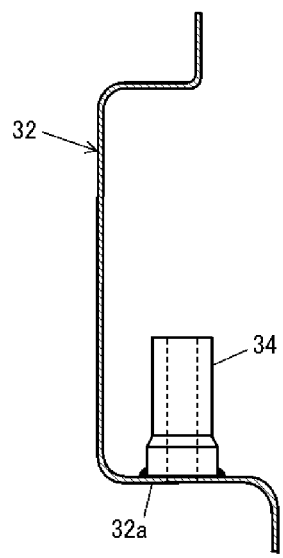
FIGS. 10A-10D are explanatory diagrams of manufacturing steps of the first embodiment.
Figure 10B:
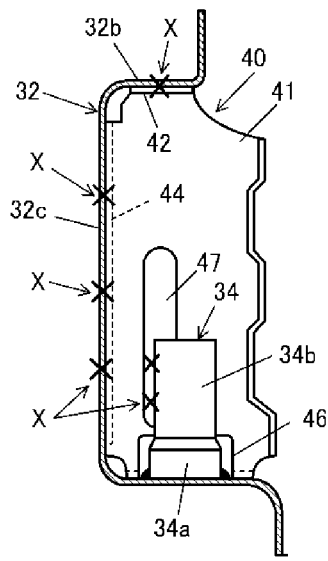

Firstly, as shown in FIG. 10A, the nut 34 is placed onto the lower horizontal face portion 32a of the inner panel 32 and its lower end portion is welded for unification. Then, as shown in FIG. 10B, the bulkhead 40 is arranged in the inner panel 32, the first and third flange portions 42, 44 are joined to the upper horizontal face portion 32b and the vertical face portion 32c of the inner panel 32 by spot welding, respectively, and the protruding portion 47 of the partition face portion 41 is welded to the upper portion 34b of the nut 34.

Figure 10C:
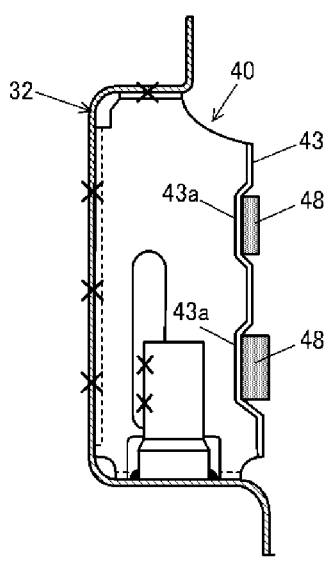
Figure 10D:
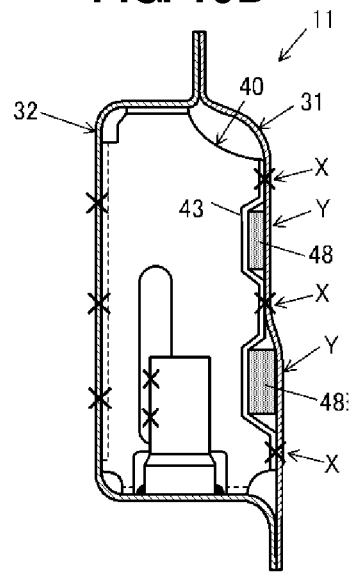

Next, as shown in FIG. 10C, the relatively-thick sheet-shaped viscoelastic members 48, 48 are arranged at the seat portions 43a, 43a of the second flange portion 43 of the bulkhead 40, their one-side faces are made adhere by means of their own adhesive force. Then, as shown in FIG. 10D, the outer panel 31 is arranged so as to overlap the second flange portion 43 of the bulkhead 40 to which the viscoelastic members 48, 48 adhere, and the upper and lower flanges of the outer panel 31 and the upper and lower flanges of the inner panel 32 are joined to each other by welding. Further, the outer panel 31 and the second flange portion 43 of the bulkhead 40 are joined by spot welding. Herein, the other-side faces of the viscoelastic members 48, 48 are pressed against the outer panel 31 and joined to the inner face of the outer panel 31. Thus, the front side frame 11 is completed.

Next, the second embodiment in which the present invention is applied to the front portion of the vehicle body like the above-described first embodiment will be described.

Figure 11:
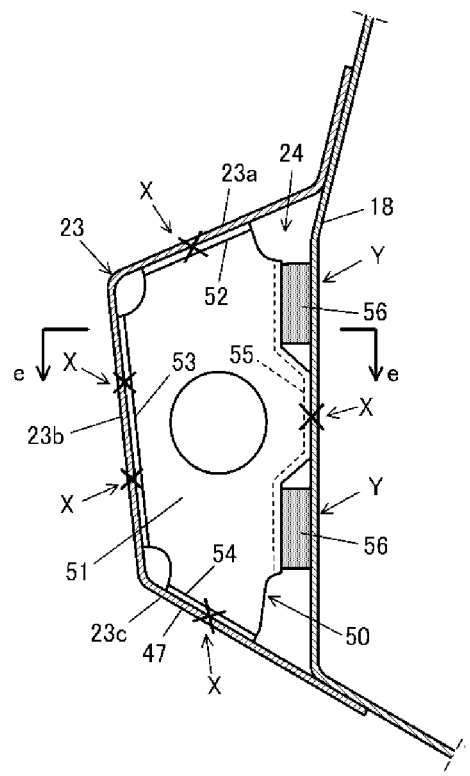
FIG. 11 is a sectional view of the second embodiment taken along line b-b of FIG. 5.

In the second embodiment, the present invention is applied to the dash lower reinforcement 23 which reinforces the inlet portion of the tunnel 22 provided at the central portion, in the vehicle width direction, of the lower side of the dash lower panel 18 shown in FIG. 5 and has substantially the gate shape along the inlet portion. As shown in FIG. 11, this dash lower reinforcement 23 has substantially the U-shaped section, and its peripheral edge portion is joined to a front face of the dash lower panel 18. Thus, a closed-section portion 24 is formed between the dash lower reinforcement 23 and the dash lower panel 18, which extends in the vehicle width direction and has substantially a mountain shape in the elevational view.

Figure 12:
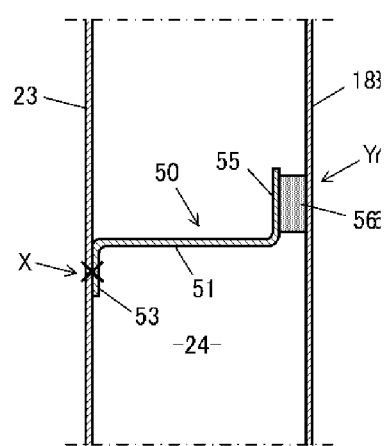
FIG. 12 is a sectional view of the second embodiment taken along line e-e of FIG. 11.

Further, as shown in FIGS. 11 and 12, a bulkhead 50 as the reinforcing member is provided in the above-described closed-section portion 24, and this closed-section portion is partitioned into right and left sides by the bulkhead 50.

Figure 13:
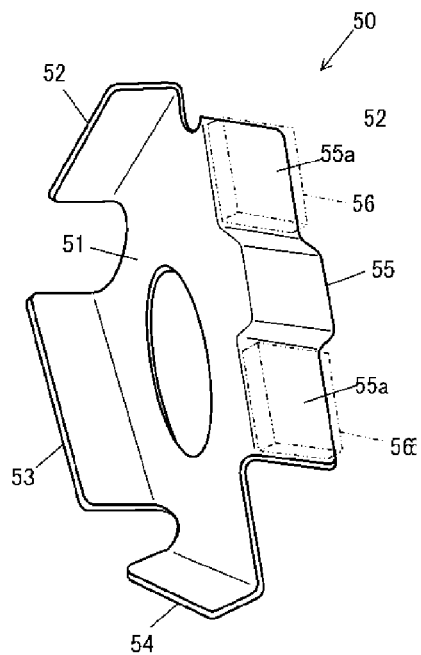
FIG. 13 is a perspective view of a reinforcing member according to the second embodiment.

The bulkhead 50 comprises, as shown in FIG. 13, a partition face portion 51 which partitions the closed-section portion 24, first, second and third flange portions 52, 53, 54 which are provided at an upper side portion, a front side portion and a lower side portion of the partition face portion 51, respectively, and extend toward the central portion of the vehicle body, and a fourth flange portion 55 which is provided at a rear side portion of the partition face portion 51 and extends toward the vehicle outside. Seat portions 55a, 55a are formed at the fourth flange portion 55 in a recess shape so as to accommodate viscoelastic members 56, 56 therein.

Firstly, the first, second and third flange portions 52, 53, 54 of the bulkhead 50 are joined to respective inner faces of an upper face portion 23a, a front face portion 23b and a lower face portion 23c of the dash lower reinforcement 23 by spot welding. And, the viscoelastic members 56, 56 are placed onto the seat portions 55a, 55a of the fourth flange portion 55, and their one-side faces are made adhere. In this state, the other-side faces of the viscoelastic members 56, 56 are pressed against a front face of the dash panel 18 and made adhere to this panel 18. Herein, the dash lower reinforcement 23 is arranged at the front face of the dash panel 18, and then its peripheral edge portion is joined to the dash lower panel 18. Further, a middle portion of the fourth flange portion 55 between the seat portions 55a, 55a is joined to the dash lower panel 18 by spot welding.

Thus, the structure with the closed-section portion 24 which is partitioned by the bulkhead 50 is formed between the dash lower panel 18 and the dash lower reinforcement 23. In this case, the above-described spot-welding portions of the bulkhead 50 to the dash lower panel 18 and the dash lower reinforcement 23 constitute the rigid joint portions X . . . X, and the joint portions of the bulkhead 50 to the dash lower penal 18 via the viscoelastic members 56, 56 constitute the flexible joint portions Y, Y.

Accordingly, the rigidity of the tunnel inlet portion at the lower portion of the dash lower panel 18 of the second embodiment can be increased, and the vibration can be damped at the lower portion of the dash lower panel 18 by the flexible joint portions Y, Y between the bulkhead 50 and the dash lower panel 18.

Next, third and fourth embodiments in which the present invention is applied to a front portion of the vehicle compartment will be described.

Figure 14:
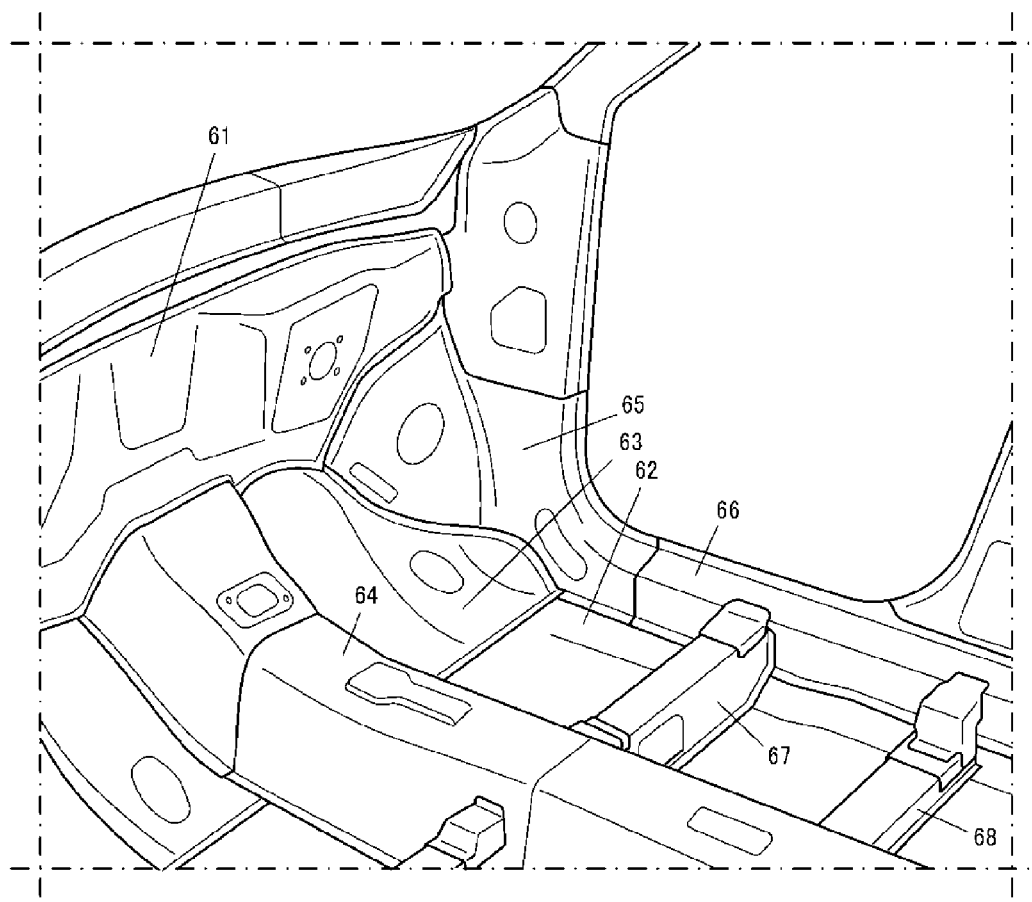
FIG. 14 is a perspective view of a vehicle-body front portion to which third and fourth embodiments of the present invention are applied.
Figure 15:
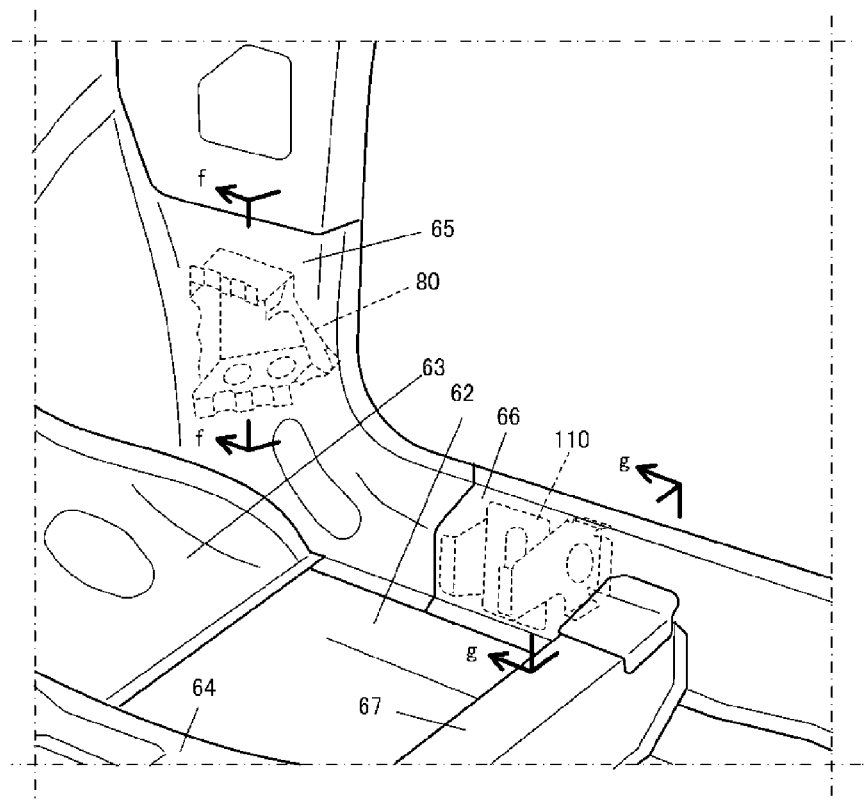
FIG. 15 is an enlarged perspective view of a major portion of the vehicle-body front portion shown in FIG. 14.

As shown in FIGS. 14 and 15, the front portion of the vehicle compartment comprises a dash lower panel 61 which forms a front face of the vehicle compartment, a front floor panel 62 which forms a bottom face of the vehicle compartment, a front frame reinforcement 63 which is arranged at a foot portion for a front seat between the panels 61, 62, and others. A tunnel reinforcement 64 which extends longitudinally is provided at a center of a bottom portion of the vehicle compartment.

Below a side portion of the dash lower panel 61 at a vehicle-compartment side portion are provided a side sill inner front 65 and a side sill inner 66 which is continuous from a rear end of the side sill inner front 65 at a corner portion where a lower end portion of a hinge pillar supporting a front door and a side sill provided at a lower portion of a side face of the vehicle body cross each other. Further, on an upper face of the font floor panel 62 are provided a No. 2 cross member 67 and a No. 2.5 cross member 68 which extend in the vehicle width direction and interconnect the tunnel reinforcement 64 and the side sill inner 66.

In the third and fourth embodiments, the present invention is applied to the lower end of the hinge pillar where the side sill inner front 65 is provided and a portion in front of a connection portion the No. 2 cross member at a front portion of the side sill where the side sill inner 66 is provided, respectively. Firstly, the third embodiment of the lower end portion of the hinge pillar will be described.

Figure 16:
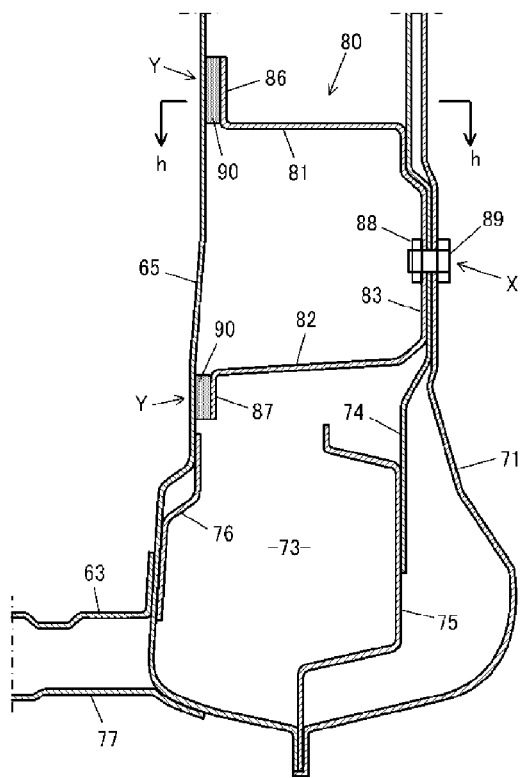
FIG. 16 is a sectional view of the third embodiment taken along line f-f of FIG. 15.
Figure 17:
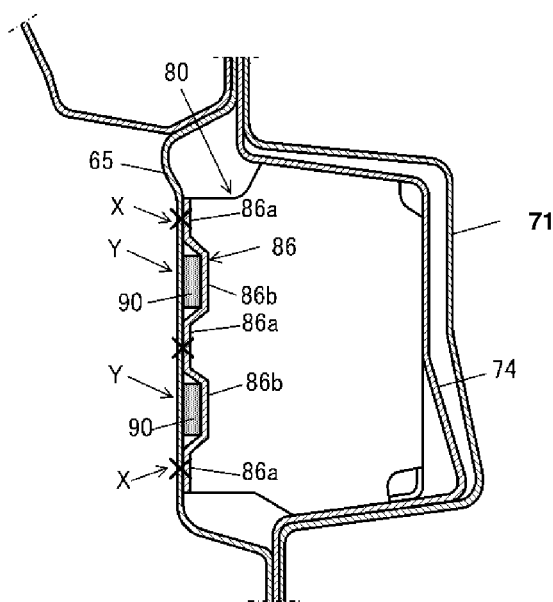
FIG. 17 is a sectional view of the third embodiment taken along line h-h of FIG. 16.

As shown in FIGS. 16 and 17, the corner portion where the lower end portion of the hinge pillar and the front end portion of the side sill cross each other is configured such that its vehicle-outside portion is formed by a side frame outer 71 and its vehicle-inside portion is formed by the side sill inner front 65. Flanges formed at their front edge portions, lower edge portions and rear edge portions are joined to each other, so that a closed-section portion 73 is formed between the side frame outer 71 and the side sill inner front 65. Herein, the side frame outer 71 is integrally formed with a side sill outer 101, a roof rail outer, a hinge pillar outer, a center pillar outer, a rear pillar outer, a front pillar outer, and a rear fender.

Further, in the closed-section portion 73 are provided a hinge pillar reinforcement 74 which is arranged along an inner face of the side frame outer 71, a side sill outer reinforcement 75 which is joined to a lower portion of the hinge pillar reinforcement 74, and a side sill inner 76 which is arranged along an inner face of a lower portion of the side sill inner front 65. The above-described dash lower panel 61 and a vehicle-outside end portion of a torque box 77 provided below the dash lower panel 61 are joined to a vehicle-inside face of a lower end portion of the side sill inner front 65.

Moreover, a bulkhead 80 as the reinforcing member is provided in the closed-section portion 73 between the hinge pillar reinforcement 74 arranged on the vehicle outside and the side sill inner front 65 arranged on the vehicle inside.

Figure 18:
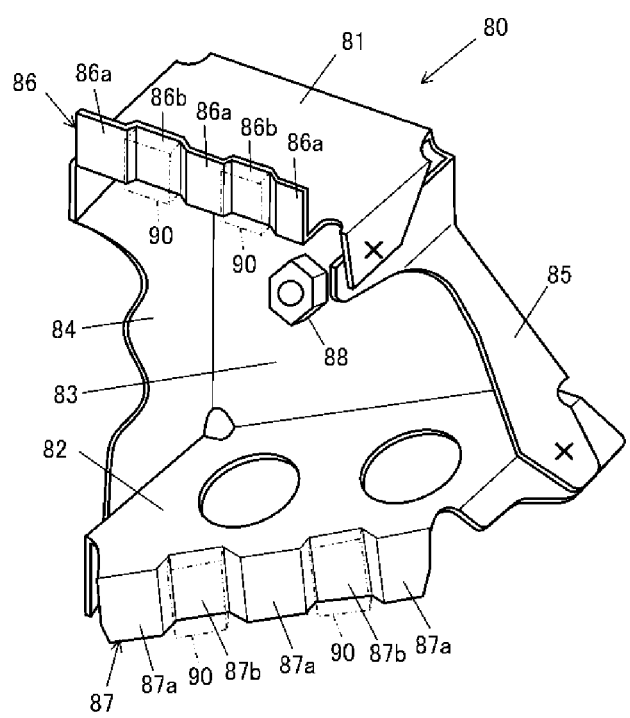
FIG. 18 is a perspective view of a reinforcing member according to the third embodiment.

This bulkhead 80 comprises first and second partition faces 81, 82 which extend substantially horizontally at upper and lower portions thereof, respectively, as shown in FIG. 18. Respective vehicle-outside end portions of the partition faces 81, 82 are interconnected by a vertical face portion 83 as the connection portion, so that substantially a U-shaped section is formed as shown in FIG. 16.

Further, first and second bending face portions 84, 85 which bend toward the vehicle inside from front and rear edge portions of the vertical face portion 83, respectively, are provided, upper and lower end portions of the first bending face portion 84 are joined to front side portions of the first and second partition face portions 81, 82, and upper and lower end portions of the second bending face portion 85 are joined to rear side portions of the first and second partition face portions 81, 82. Thus, the bulkhead 80 is formed substantially in a box shape with its vehicle-inside face opening.

At vehicle-inside side portions of the first and second partition face portions 81, 82 are provided first and second flange portions 86, 87 which extend upward and downward, respectively. The flange portions 86, 87 respectively comprise three flat face portions for welding 86*a* . . . 86*a*, 87*a* . . . 87*a* which project toward the vehicle inside and two seat portions for arrangement of viscoelastic member 86*b*, 86*b*, 87*b*, 87*b* which retreat from the above-described flat face portions. The flat faces 86*a* . . . 86*a*, 87*a* . . . 87*a* and the seat portions 86*b*, 86*b*, 87*b*, 87*b* are formed one after the other. A nut 88 is welded to an inner face of the vertical face portion 83 at a position corresponding to a bolt through hole (not illustrated).

Herein, a bolt 89 is inserted into the bolt through holes of the side frame outer 71, the hinge pillar reinforcement 74, and the vertical face portion 83 of the bulkhead 80 in a state in which the vertical face portion 83 of the bulkhead 80 overlaps an inner face of the hinge pillar reinforcement 74 arranged on the inside of the side frame outer 71, and then the nut 88 welded to the inner face of the vertical face portion is fastened to the bolt 89. Thereby, the bulkhead 80 is fixed to the side frame outer 71 via the hinge pillar reinforcement 74.

Next, viscoelastic members 90 . . . 90 are arranged at the seat portions 86*b*, 87*b* formed at the first and second flange portions 86, 87 of the bulkhead 80. Herein, while pressing the viscoelastic members 90 . . . 90 in a state in which one-side faces of these viscoelastic members 90 . . . 90 adhere to the seat portions 86*b*, 87*b*, the side sill inner front 65 is made overlap the side frame outer 71, and these two members are joined.

Herein, the other-side faces of the viscoelastic members 90 . . . 90 adhere to the inner face of the side sill inner front 65, and the flat face portions 86*a* . . . 86*a*, 87*a* . . . 87*a* formed at the first and second flange portions 86, 87 are positioned to face the inner face of the side sill inner front 65, then these facing portions are joined by one-side welding from the outside (the vehicle inside) of the side sill inner front 65.

Thus, the closed-section portion 73 is formed by the side frame outer 71 and the side sill inner front 65 with the bulkhead 80 arranged therein. In this case, the one-side welding portions at the first and second flange portions 86, 87 of the bulkhead 80 and the fastening portion at the vertical face portion 83 with the bolt 89 and the nut 88 constitute the rigid joint portions X . . . X, and the joint portions of the first and second flange portions 86, 87 to the side sill inner front 65 via the viscoelastic members 90 . . . 90 constitute the flexible joint portions Y . . . Y.

Thus, according to the third embodiment, the rigidity of the lower end portion of the hinge pillar which the side sill crosses can be improved, and the vibration at this portion can be damped by the flexible joint portions Y . . . Y. Herein, since the bulkhead 80 has the two partition face portions 81, 82 where the rigid joint portion X and the flexible joint portion Y are provided in the third embodiment, the rigidity-improvement effect and the vibration-damping effect can be provided properly over a wide range of the lower end portion of the hinge pillar.

Figure 19:
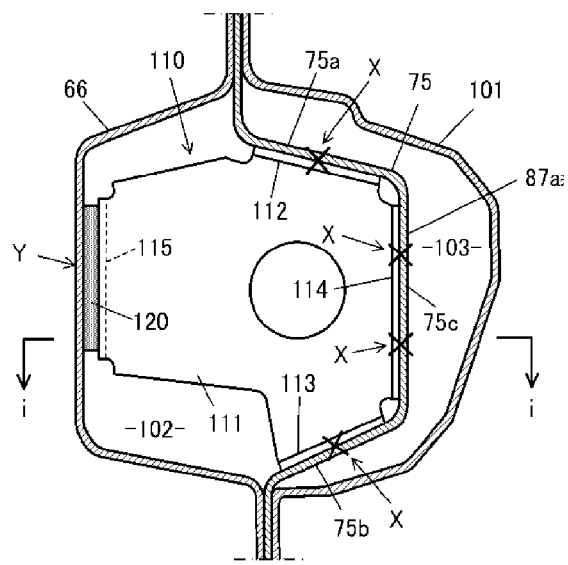
FIG. 19 is a sectional view of the fourth embodiment taken along line g-g of FIG. 15.
Figure 20:
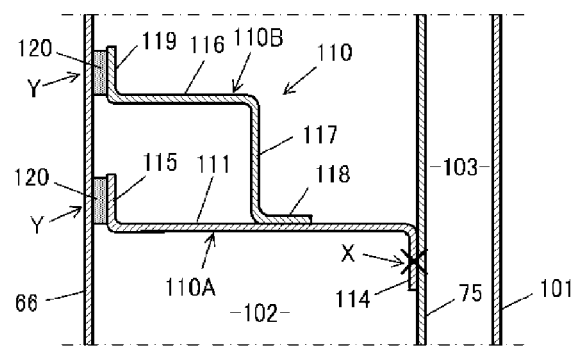
FIG. 20 is a sectional view of the fourth embodiment taken along line i-i of FIG. 19.

Next, the fourth embodiment will be described. The front end portion of the side sill shown in FIGS. 14 and 15 comprises, as shown in FIGS. 19 and 20, the side sill outer 101 forming the vehicle-outside of the side sill, the side sill inner 66 forming the vehicle-inside of the side sill, and the side sill outer reinforcement 75 arranged between the panels 101, 66 to have a U-shaped section. Upper edge portions and lower edge portions of these three members are joined together, so that first and second closed-section portions 102, 103 extending longitudinally are formed in the side sill by being partitioned by the side sill outer reinforcement 75.

A bulkhead 110 is arranged in the first closed-section portion 102 having a larger sectional area formed by the side sill outer reinforcement 75 and the side sill inner 76, which partitions the first closed-section portion 102 into a front-side part and a rear-side part.

Figure 21:
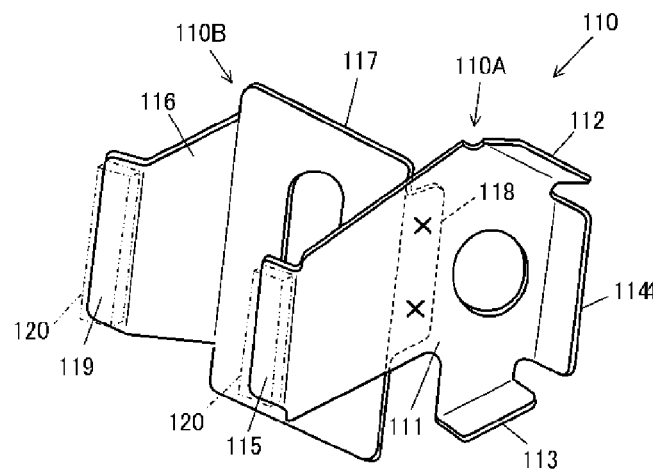
FIG. 21 is a perspective view of a reinforcing member according to the fourth embodiment.

As shown in FIG. 21, this bulkhead 110 is formed by first and second members 110A, 110B, and the first member 110A comprises a partition face portion 111 which partitions the closed-section portion 102, first, second and third flange portions 112, 113, 114 which are respectively provided at upper, lower and vehicle-outside side portions of the partition face portion 111 and extend rearward, and a fourth flange portion 115 which is provided at a vehicle-inside side portion of the partition face portion 111 and extend forward.

The second member 110B comprises a first face portion 116 which is positioned in front of and substantially in parallel to the partition face portion 111 of the first member 110A, and a second face portion 117 which bends rearward from a vehicle-outside side portion of the first face portion 116. A fifth flange portion 118 which is provided at a rear end portion of the second face portion 117 and extends toward the vehicle outside is welded to substantially a central portion, in the vehicle width direction, of a front face of the partition face portion 111 of the first member 110A. Thus, the first and second members 110A, 110B are made integral, and the bulkhead 110 has substantially h-shaped flat faces as shown in FIG. 20.

Further, a sixth flange portion 119 which is provided at a vehicle-inside side portion of the first face portion 116 and extends forward is provided at the second member 110B of the bulkhead 110, and this sixth flange portion 119 and the fourth flange portion 115 of the first member 110A are disposed substantially on the same face.

In the fourth embodiment, firstly, a vehicle-outside half portion of the first member 110A of the bulkhead 110 is inserted into the inside of the U-shaped side sill outer reinforcement 75, and the first, second and third flange portions 112, 113, 114 of the first member 110A are joined to inner faces of an upper face portion 75a, a lower face portion 75b and the vehicle-outside vertical face portion 75c of the side sill outer reinforcement 75 by spot welding. Thus, the bulkhead 110 and the side sill outer reinforcement 75 are made integral.

Then, while pressing viscoelastic members 120, 120 in a state in which one-side faces of the viscoelastic members 120, 120 adhere to respective inner faces of the fourth flange portion 115 of the first member 110A and the sixth flange portion 119 of the second member 110B of the bulkhead 110, the side sill inner 66 is made overlap the side sill outer reinforcement 75 from the vehicle inside. Subsequently, the side sill outer 101 is made overlap them from the vehicle outside, and these three members' upper and lower flanges are joined together. Herein, the other-side faces of the viscoelastic members 120, 120 are made adhere to the inner face of the side sill inner 66.

Thus, the side sill is formed in a state in which the bulkhead 110 is arranged in the first closed-section portion 102 which is formed by the side sill inner 66 and the side sill outer reinforcement 75. Herein, the spot welding portions of the first, second and third flange portions 112, 113, 114 of the first member 110A to the side sill outer reinforcement 75 constitute the rigid joint portions X . . . X, and the joint portions of the fourth flange portion 115 of the first member 110A and the sixth flange portion 119 of the second member 110B to the side sill inner 66 via the viscoelastic members 120, 120 constitute the flexible joint portions Y, Y.

Thus, according to the fourth embodiment, the rigidity of the front portion of the side sill can be improved, and the vibration at this portion can be damped by the flexible joint portions Y, Y.

Hereafter, a fifth embodiment in which the present invention is applied to a front end portion of the vehicle compartment will be described.

Figure 22:
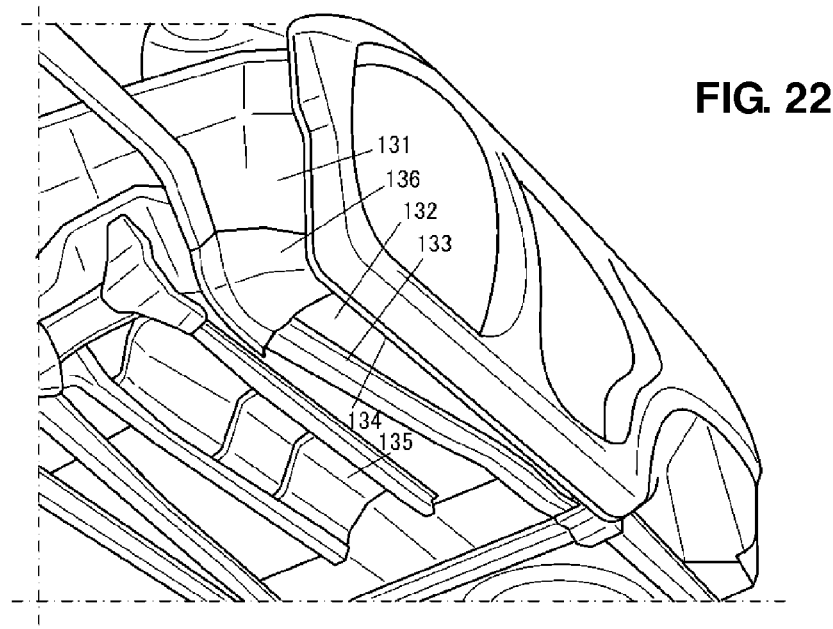
FIG. 22 is a perspective view of a vehicle-body front portion to which a fifth embodiment is applied, when viewed from below.

As shown in FIG. 22, a lower face of the vehicle compartment is formed by a dash lower panel 131 and a floor panel 132, and a front floor frame 133 which extends rearward from an engine-room side is joined to a lower face of the floor panel 132 and extends rearward passing through a space between a side sill inner 134 and a tunnel reinforcement 135.

The front floor frame 133 bends at a joint portion of the dash lower panel 131 to the floor panel 132 in such a manner that its rear portion lowers. A torque box 136 is provided at the joint portion of the dash lower panel 131 to the floor panel 132 so as to interconnect the front floor frame 133 and the side sill inner 134 for ensuring the rigidity of the above-described bending portion of the front floor frame 133.

Figure 23:
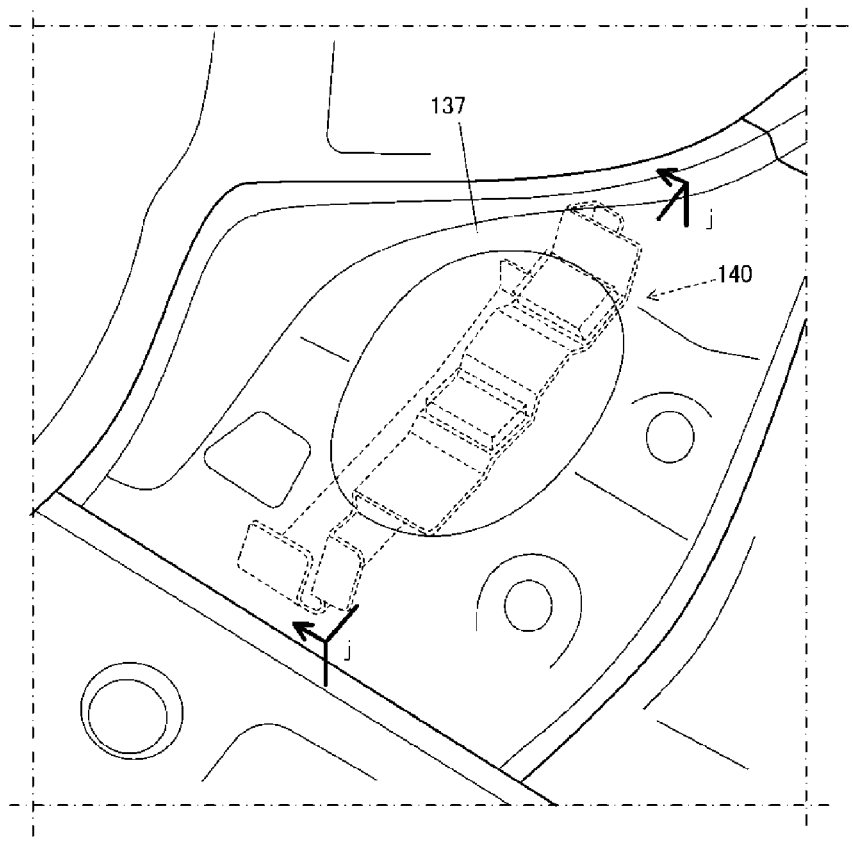
FIG. 23 is an enlarged perspective view of a major portion of the portion shown in FIG. 22, when viewed from a vehicle inside.
Figure 24:
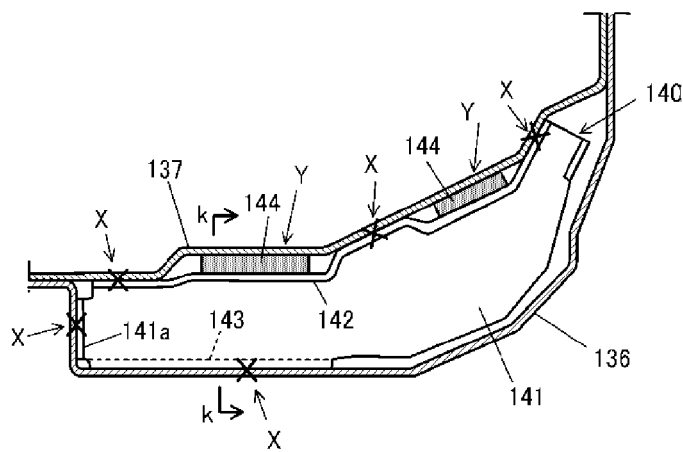
FIG. 24 is a sectional view of the fifth embodiment taken along line j-j of FIG. 23.
Figure 25:
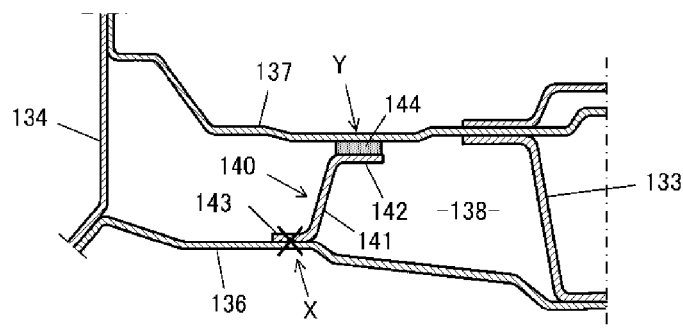
FIG. 25 is a sectional view of the fifth embodiment taken along line k-k of FIG. 24.

A front frame reinforcement 137 is arranged on the vehicle inside of the torque box 136 as shown in FIG. 23. As shown in FIGS. 24 and 25, a closed-section portion 138 is formed by the front frame reinforcement 137 and the torque box 136 which are arranged substantially in parallel to each other and the front floor frame 133 and the side sill inner 134 which are respectively positioned on the vehicle inside and the vehicle outside. A bulkhead 140 is provided in the closed-section portion 138 and partitions this portion 138 into a right portion and a left portion.

Figure 26:
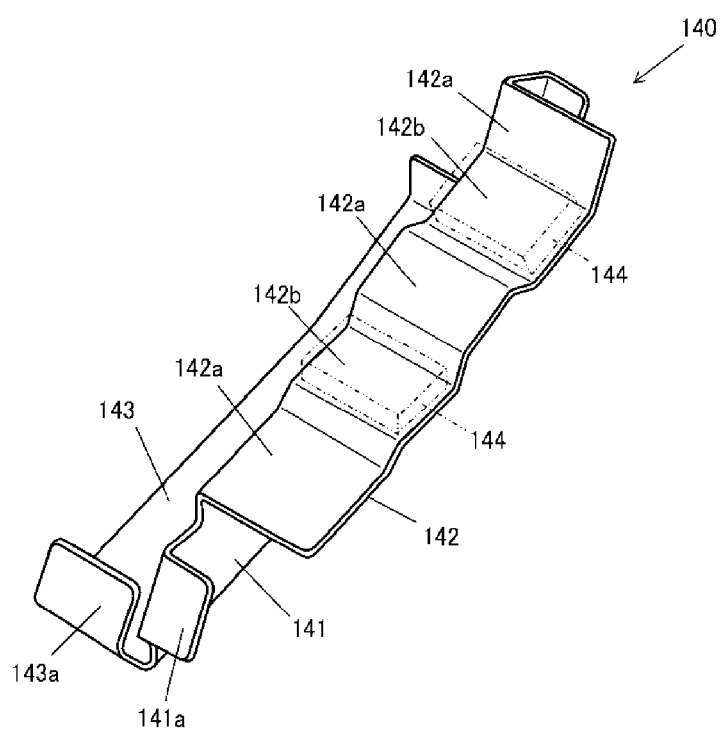
FIG. 26 is a perspective view of a reinforcing member according to the fifth embodiment.

The bulkhead 140 comprises, as shown in FIG. 26, a partition face portion 141, a first flange portion 142 which extends toward the vehicle inside from an upper side portion of the partition face portion 141, and a second flange portion 143 which extends toward the vehicle outside from a lower side portion of the partition face portion 141. The first flange portion 142 slightly curves such that its front side is located above the level of its front side. Flat face portions for welding 142a . . . 142a are formed at three positions of a front end portion, a central portion and a rear end portion of the first flange portion 142, and seat portions for viscoelastic member 142b, 142b are formed at two positions between the flat face portions 142a . . . 142a. Further, bending piece portions for welding 141a, 143a are formed at rear end portions of the partition face portion 141 and the second flange portion 143 in such a manner that these portions 141a, 143a are located on the same face.

In the fifth embodiment, firstly, the bulkhead 140 is arranged in the torque box 136, and the second flange portion 143 and the bending piece portions 143a, 141a provided at the rear end portions of the second flange portion 143 and the partition face portion 141 are joined to an inner face of the torque box 136 by spot welding. Thus, the torque box 136 and the bulkhead 140 are made integral.

Next, viscoelastic members 144, 144 are disposed at the seat portions 142b, 142b at the first flange portion 142 of the bulkhead 140, and one-side faces of the viscoelastic members 144, 144 are made adhere to the seat portions 142b, 142b. In this state, the other-side faces of the viscoelastic members 144, 144 are made adhere by pressing the viscoelastic members 144, 144 against a lower face of the front frame reinforcement 137, whereby the torque box 136 is arranged at the lower face of the front frame reinforcement 137. Then, flanges formed at a periphery of the torque box 136 are welded to the front frame reinforcement 137, and the front frame reinforcement 137 and the flat face portions 142a . . . 142a at the first flange portion 142 of the bulkhead 140 are welded to each other by one-side welding.

As described above, the closed-section portion 138 which is formed by the torque box 136, the front frame reinforcement 137, the front floor frame 133 and the side sill inner 134 is partitioned by the bulkhead 140 into a right portion and a left portion. Thus, a lower face portion of the front end of the vehicle compartment is formed.

Herein, the spot welding portions of the partition face portion 141 and the second face portion 143 of the bulkhead 140 to the torque box 136 and the one-side welding portion of the first face portion 142 of the bulkhead to the front frame reinforcement 137 constitute the rigid joint portions X . . . X, and the joint portions of the first flange portion 142 of the bulkhead 140 to the front frame reinforcement 137 via the viscoelastic members 144 constitute the flexible joint portions Y, Y.

Thus, according to the fifth embodiment, the rigidity of the lower portion of the front end portion of the vehicle compartment can be improved, and the vibration at this portion can be damped by the flexible joint portions Y, Y.

Hereafter, sixth and seventh embodiments in which the present invention is respectively applied to a center pillar and a roof rail at an upper portion of the side face of the vehicle body will be described.

Figure 27:
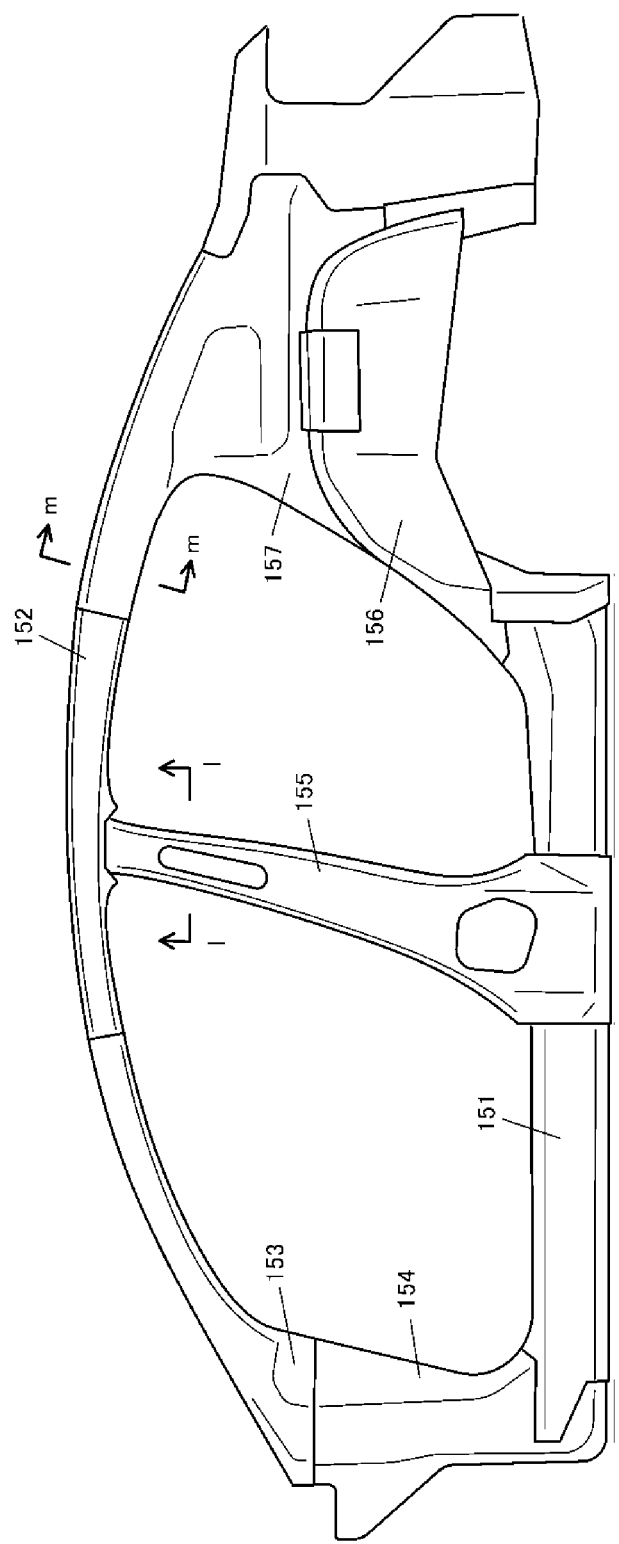
FIG. 27 is a side view of a vehicle body to which sixth and seventh embodiments are applied.

FIG. 27 is a right side view of the vehicle body, when viewed from the vehicle inside. A side sill 151 which extends longitudinally at a lower portion of the vehicle-body side face and a roof rail 152 which extends longitudinally at an upper portion of the vehicle-body side face are provided. A front pillar 153 and a hinge pillar 154 are connected to respective front portions of the side sill 151 and the roof pillar 152. A center pillar 155 is connected to respective central portions of the side sill 151 and the roof pillar 152. A rear wheel house 156 and a rear pillar 157 which extends upward from the rear wheel house 156 and connects to the roof rail 152 are connected to respective rear portions of the side sill 151 and the roof pillar 152.

The sixth embodiment is an example in which the present invention is applied to the upper end portion of the above-described center pillar 155, and the seventh embodiment is another example in which the present invention is applied to the rear portion of the above-described roof rail 152. Firstly, the sixth embodiment will be described.

Figure 28:
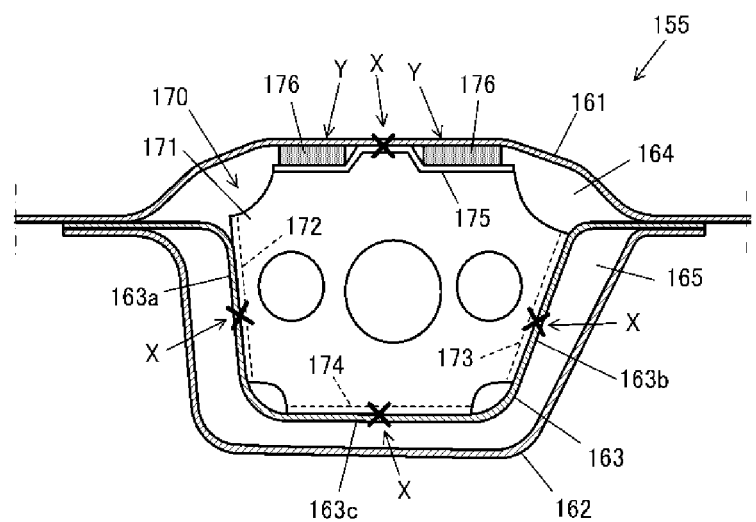
FIG. 28 is a sectional view of the sixth embodiment taken along line l-l of FIG. 27.

As shown in FIG. 28, the center pillar 155 is comprised of a center pillar inner 161 which is arranged on the vehicle inside, a side frame outer 162 which is arranged on the vehicle outside, and a center pillar outer reinforcement 163 which is arranged between these members 161, 162 and has a U-shaped section protruding toward the vehicle outside. Flanges of respective front edge portions and rear edge portions of these three members are joined together. Thus, first and second closed-section portions 164, 165 which extend vertically are partitioned by the center pillar outer reinforcement 163.

Further, a bulkhead 170 is provided in the first closed-section portion 164 having a larger sectional area so as to partition this closed-section portion 164.

Figure 29:
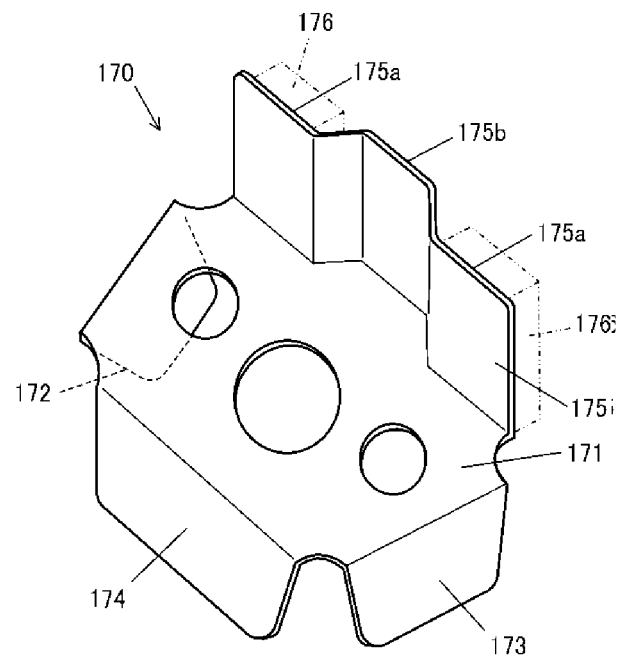
FIG. 29 is a perspective view of a reinforcing member according to the sixth embodiment.

The bulkhead 170 comprises, as shown in FIG. 29, a partition face portion 171 which partitions the first closed-section portion 164, first, second and third flange portions 172, 173, 174 which are provided at front and rear side portions and a vehicle-outside side portion of the partition face portion 171 and extend downward, and a fourth flange portion 175 which is provided at a vehicle-inside side portion of the partition face portion 171 and extends upward. The fourth flange portion 175 has two seat portions 175a, 175a which retreat for disposition of viscoelastic members and a flat face portion for welding 175b formed between the seat portions 175a, 175a.

In the sixth embodiment, firstly, the bulkhead 170 is inserted into the U-shaped center pillar outer reinforcement 163, and the first, second and third flange portions 172, 173, 174 are joined to inner faces of the front face portion 163a, the rear face portion 163b, and the vehicle-outside vertical face portion 163c of the center pillar outer reinforcement 163 by spot welding. Thus, the bulkhead 170 and the center pillar outer reinforcement 163 are made integral.

Next, viscoelastic members 176, 176 are disposed at the seat portions 175a, 175a at the fourth flange portion 175 of the bulkhead 170, and one-side faces of the viscoelastic members 176, 176 are made adhere to the seat portions 175a, 175a. In this state, the other-side faces of the viscoelastic members 176, 176 are made adhere by pressing the viscoelastic members 176, 176, whereby the center pillar inner 161 is made overlap the center pillar outer reinforcement 163 from the vehicle inside. Then, the flat face portion 175b of the fourth flange portion 175 is welded by one-side welding. Further, the side frame outer 162 is made overlap them from the vehicle outside, then front and rear flanges of these three members are joined together respectively by spot-welding.

Thus, the center pillar 155 is formed in a state in which the bulkhead 170 is arranged in the first closed-section portion 164 which is formed by the center pillar inner 161 and the center pillar outer reinforcement 163. Herein, the spot welding portions of the first, second and third flange portions 172, 173, 174 of the bulkhead 170 to the center pillar outer reinforcement 163 and the one-side welding portion of the fourth flange portion 175 to the center pillar inner 161 constitute the rigid joint portions X . . . X, and the joint portions of the fourth flange portion 175 to the center pillar inner 161 via the viscoelastic members 176, 176 constitute the flexible joint portions Y, Y.

Thus, according to the sixth embodiment, the rigidity of the upper portion of the center pillar 155 can be improved, and the vibration at this portion can be damped by the flexible joint portions Y, Y.

Figure 30:
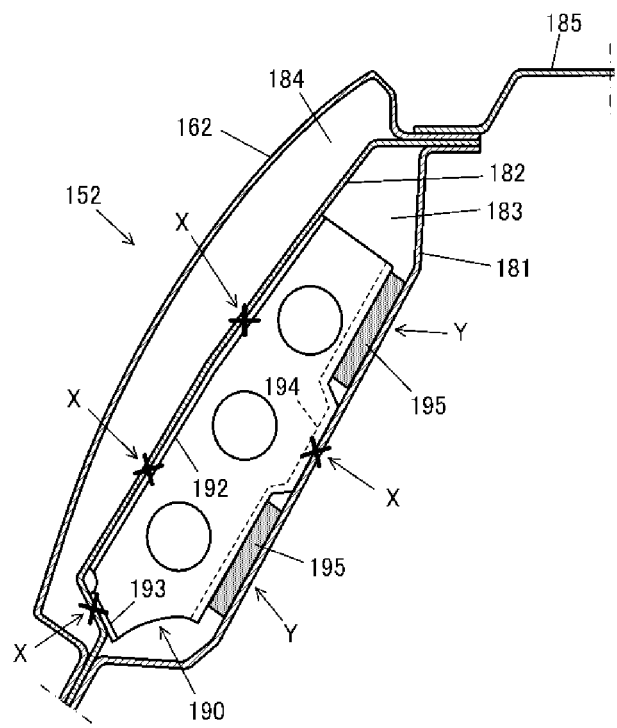
FIG. 30 is a sectional view of the seventh embodiment taken along line m-m of FIG. 27.

Next, the seventh embodiment in which the present invention is applied to the rear portion of the roof rail 152 will be described. As shown in FIG. 30, the roof rail 152 comprises a roof rail inner 181 arranged on the vehicle inside, a roof rail reinforcement 182 arranged on the vehicle outside, and the above-described side frame outer 162 arranged on the outside of the roof rail reinforcement 182. First and second closed-section portions 183, 184 which are partitioned by the roof rail reinforcement 182 and extend longitudinally are formed. Flanges of respective lower edge portions of the roof rail inner 181, the roof rail reinforcement 182 and the side frame outer 162 are joined together, and upper edge portions of these three members are joined together, including a side edge portion of the roof panel 185.

Further, a bulkhead 190 is provided in the first closed-section portion 183 formed by the roof rail inner 181 and the roof rail reinforcement 182, which partitions the first closed-section portion 183 into its front portion and its rear portion.

Figure 31:
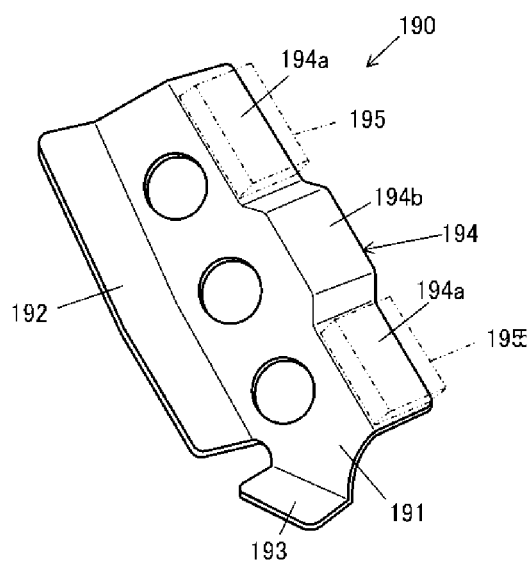
FIG. 31 is a perspective view of a reinforcing member according to the seventh embodiment.

The bulkhead 190 comprises, as shown in FIG. 31, a partition face portion 191 which partitions the first closed-section portion 183, first and second flange portions 192, 193 which are provided at a vehicle-outside side portion of the partition face portion 191 and extend forward, and a third flange portion 194 which is provided at a vehicle-inside side portion of the partition face portion 191 and extends rearward. The third flange portion 194 has two seat portions 194a, 194a for disposition of viscoelastic members and a flat face portion for welding 194b formed between the seat portions 194a, 194a.

In the seventh embodiment, firstly, the first and second flange portions 192, 193 of the bulkhead 190 are joined to a vehicle-inside face of the roof rail reinforcement 182 by spot welding. Thus, the bulkhead 190 and the roof rail reinforcement 182 are made integral.

Next, viscoelastic members 195, 195 are disposed at the seat portions 194a, 194a at the third flange portion 194 of the bulkhead 190, and one-side faces of the viscoelastic members 195, 195 are made adhere to the seat portions 194a, 194a. In this state, the other-side faces of the viscoelastic members 195, 195 are made adhere to the inner face of the roof rail inner 181, whereby the roof rail inner 181 is made overlap the roof rail reinforcement 182 from the vehicle inside. Thus, the roof rail inner 181 and the roof rail reinforcement 182 are joined via the viscoelastic members 195, 195, and the flat face portion 194b of the third flange portion 194 and a contact portion of the roof rail inner 181 are welded from the vehicle inside by one-side welding.

Further, the side frame outer 162 is made overlap the roof rail reinforcement 182 from the vehicle outside, and then the roof panel 185 is joined to these members 162, 182.

Thus, the roof rail 152 is formed in a state in which the bulkhead 190 is arranged in the first closed-section portion 183 which is formed by the roof rail inner 181 and the roof rail reinforcement 182. Herein, the spot welding portions of the first and second flange portions 192, 193 of the bulkhead 190 to the roof rail reinforcement 182 and the one-side welding portion of the third flange portion 194 to the roof rail inner 181 constitute the rigid joint portions X . . . X, and the joint portions of the third flange portion 184 to the roof rail inner 181 via the viscoelastic members 195, 195 constitute the flexible joint portions Y, Y.

Thus, according to the seventh embodiment, the rigidity of the rear portion of the roof rail 152 can be improved, and the vibration at this portion can be damped by the flexible joint portions Y, Y.

Figure 32:
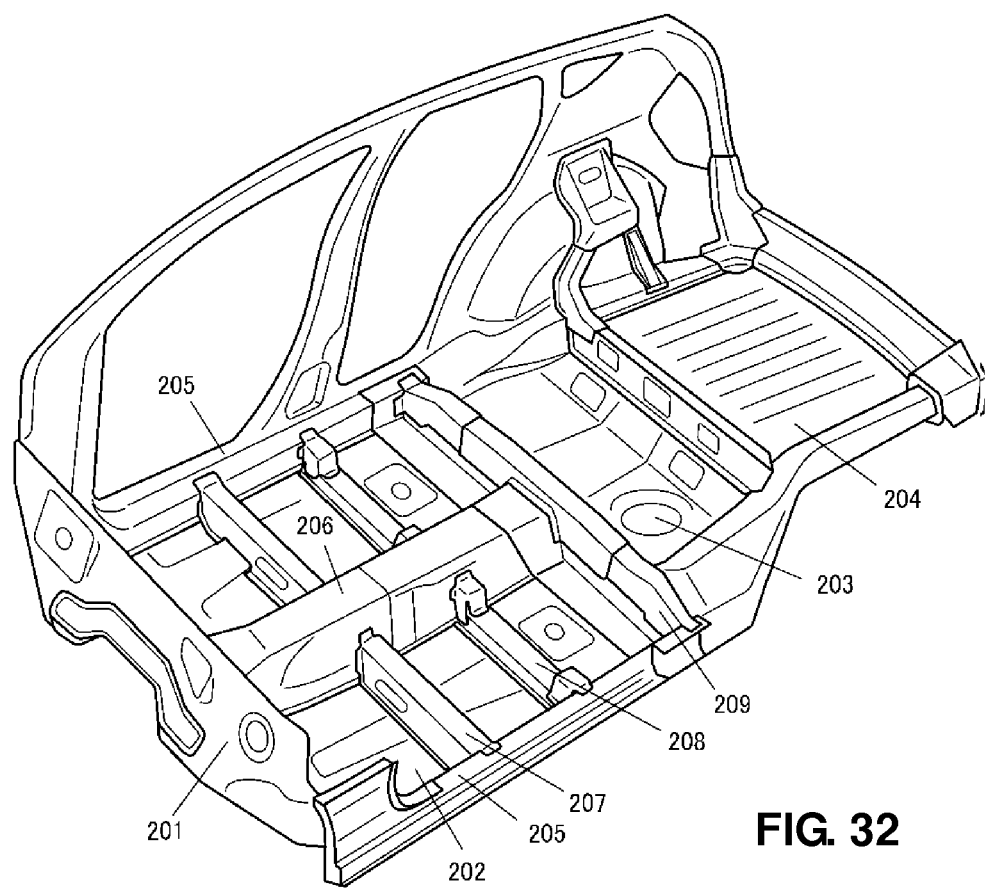
FIG. 32 is a perspective view of a vehicle-compartment bottom portion to which an eighth embodiment is applied.

Next, the eighth embodiment in which the present invention is applied to the floor of the vehicle compartment will be described. As described in FIG. 32, the front portion of the vehicle compartment is formed by a dash lower panel 201, the bottom portion of that is formed by a floor panel 202, and a bottom portion of the rear portion of that is formed by a center floor pan 203 which is continuous from the floor panel 202. A trunk floor pan 204 which rises upward is provided in back of the center floor pan 203.

Further, a pair of side sills 205, 205 which extends longitudinally is provided at both side portions of the floor panel 202. A tunnel reinforcement 206 which extends from the dash panel 201 to a front end portion of the center floor pan 203 is provided at a central portion, in the vehicle width direction, of the floor panel 202. A No. 2 cross member 207 and a No. 2.5 cross member 208 which extend in the vehicle width direction between the side sills 205, 205 and the tunnel reinforcement 206 are arranged in order from the side of the dash panel 201. A No. 3 cross member 209 is arranged at a border between the floor panel 202 and the center floor panel 203.

Figure 33:
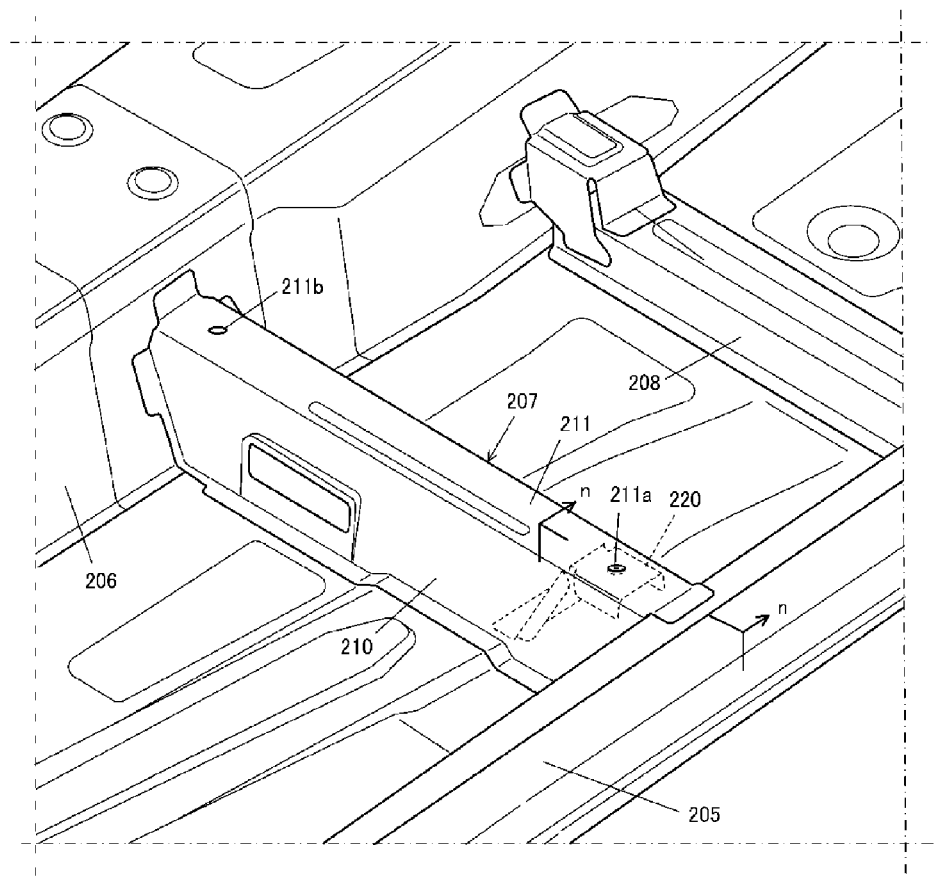
FIG. 33 is an enlarged perspective view of a major portion of the vehicle-compartment bottom portion shown in FIG. 32.
Figure 34:
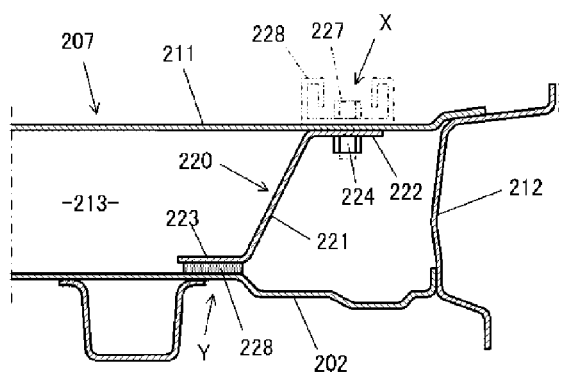
FIG. 34 is a sectional view of the eighth embodiment taken along line n-n of FIG. 33.

As shown in FIGS. 33 and 34, the No. 2 cross member 207 is comprised of a front face portion 210, a rear face portion (not illustrated), and an upper face portion 211, which form substantially a U-shaped section which opens downward. Its front and rear flanges are joined to an upper face of the floor panel 202 respectively, and the No. 2 cross member 207 extends in the vehicle width direction and its vehicle-outside end portion and vehicle-inside end portion are closed by the side sill inner 212 and the tunnel reinforcement 206. Thus, a closed-section portion 213 is formed. Bolt holes for seat-rail attachment 211a, 211b are formed at both-side end portions of the upper face portion 211. Herein, a bulkhead 220 as the reinforcing member is provided below the bolt hole 211a at the side-sill-side end portion, which partitions the closed-section portion 213.

Figure 35:
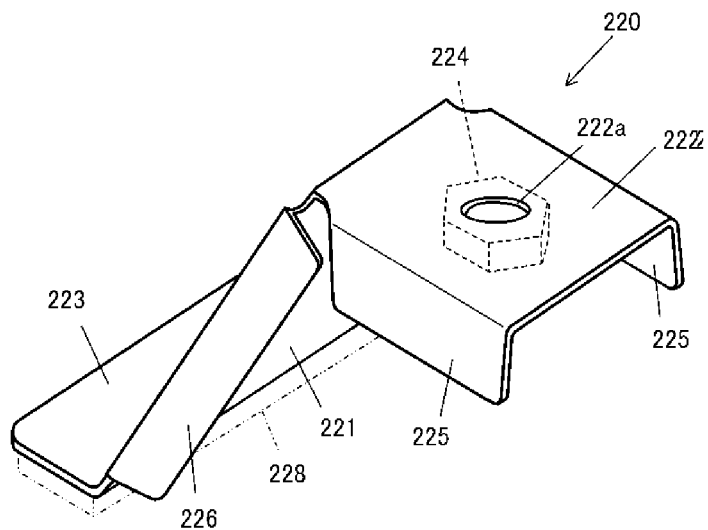
FIG. 35 is a perspective view of a reinforcing member according to the eighth embodiment.

As shown in FIG. 35, the bulkhead 220 comprises a partition face portion 221 which partitions the closed-section portion 213 and slants, a first flange portion 222 which extends from an upper end portion of the partition face portion 221 toward the vehicle-outside and has a relatively large area, and a second flange portion 223 which extends from a lower end portion of the partition face portion 221 toward the vehicle-inside. A bolt hole 222a is formed at the first flange portion 222, which overlaps the bolt hole 211a formed at the upper face portion 211 of the No. 2 cross member 207. A nut for bolt fastening 224 is welded to a lower face of the first flange portion 222 below the bolt hole 222a. Bending piece portions 225, 226 are provided at front-rear both edge portions of the partition face portion 221 and the first flange portion 222, which increases the rigidity of the portions 221, 222.

The bulkhead 220 is arranged on the inside of the vehicle-outside end portion of the No. 2 cross member 207, and then fastened together with the seat rail 228 with a bolt 227 which is inserted into the bolt holes 211a, 222a and fastened to the nut 224 in a state in which the first flange portion 222 is set onto the back side of the upper face portion 211 of the No. 2 cross member 207.

Then, a viscoelastic member 228 is disposed at a lower face of the second flange portion 223 and pressed against the floor panel 202 in a state in which a one-side face of the viscoelastic member 228 is made adhere to the lower face of the second flange portion 223. Thus, the No. 2 cross member 207 is arranged on the upper face of the floor panel 202. Consequently, the peripheral flanges of the cross member 207 are joined to the floor panel 202, the side sill inner 211, and the tunnel reinforcement 206.

Thus, the other-side face of the above-described viscoelastic member 228 is made adhere to the floor panel 202, and the bulkhead 220 is arranged in the closed-section portion 213 which is formed by the No. 2 cross member 207, the floor panel 20 and the side sill inner 212. Herein, the fastening portion of the first flange portion 222 of the bulkhead 220 to the upper face portion 211 of the No. 2 cross member 207 with the bolt 227 constitutes the rigid joint portion X, and the joint portion of the second flange portion 223 to the floor panel 202 via the viscoelastic member 228 constitutes the flexible joint portion Y.

Thus, according to the eighth embodiment, the rigidity of the No. 2 cross member 207 arranged on the floor of the vehicle compartment can be improved, and the vibration at this portion can be damped by the flexible joint portion Y.

Next, the ninth embodiment in which the present invention is applied to a side face of a rear portion of the vehicle body will be described.

Figure 36:
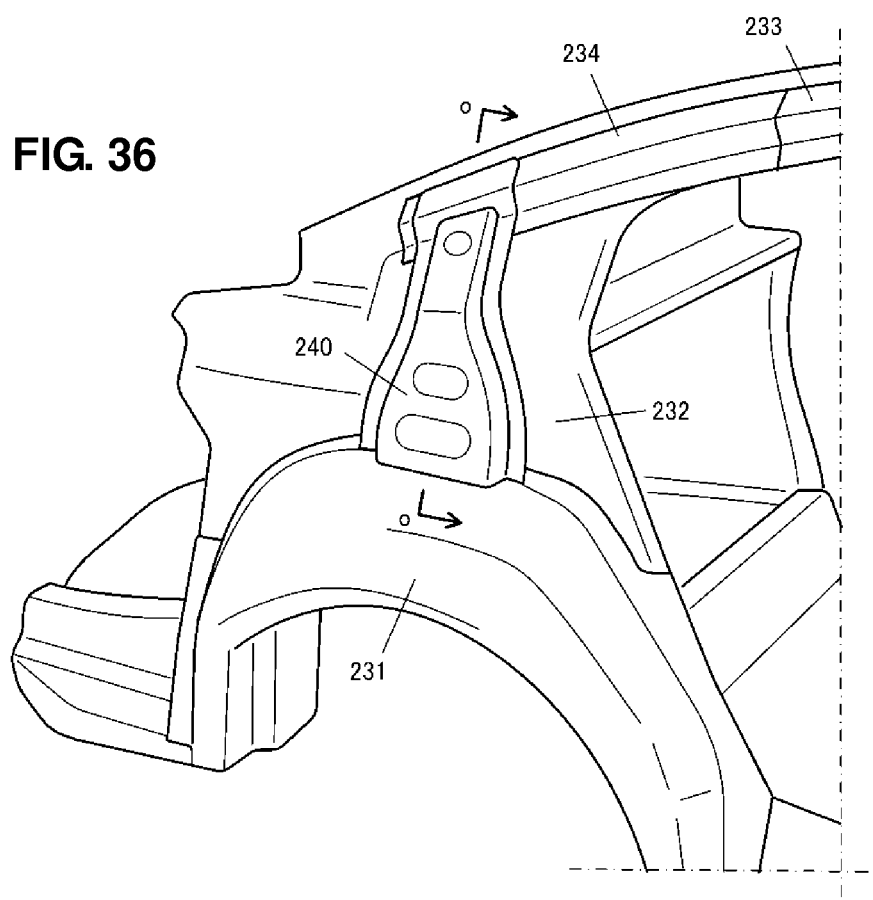
FIG. 36 is a perspective view of a vehicle-body rear portion to which a ninth embodiment is applied.

FIG. 36 shows the side face of the rear portion of the vehicle body, and a rear pillar inner 232 is provided above a rear wheel house 231 and a rear pillar reinforcement 234 which extends forward along the roof rail 233 is provided at an upper end portion of the rear pillar inner 232. A suspension housing reinforcement 240 which extends vertically is arranged at an outside face of the rear pillar inner 232, which is connected to the rear wheel house 231 at its lower end portion and connected to the rear pillar reinforcement 234 at its upper end portion.

Figure 37:
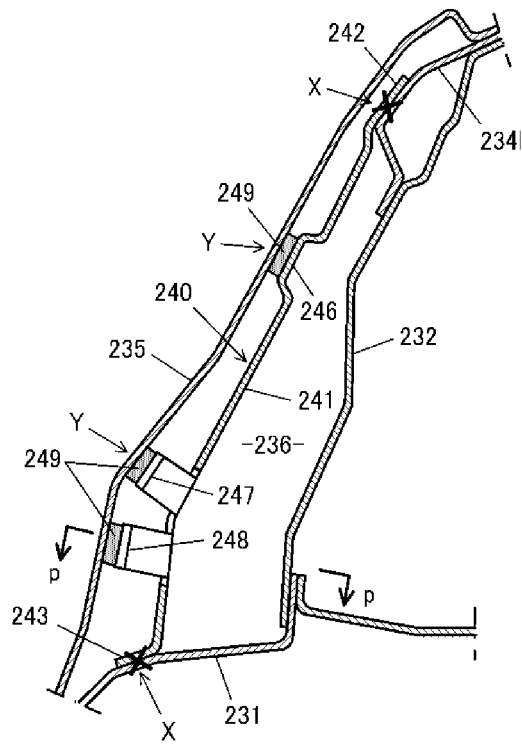
FIG. 37 is a sectional view of the ninth embodiment taken along line o-o of FIG. 36.
Figure 38:
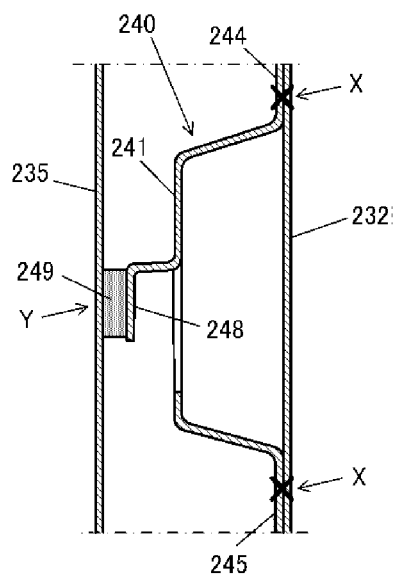
FIG. 38 is a sectional view of the ninth embodiment taken along line p-p of FIG. 37.

Further, as shown in FIGS. 37 and 38, a side frame outer 235 is provided to cover over the suspension housing reinforcement 240. The suspension housing reinforcement 240 as the reinforcing member is arranged in a closed-section portion 236 which is formed by the side frame outer 235, the rear pillar inner 232, and the rear wheel house 231.

Figure 39:
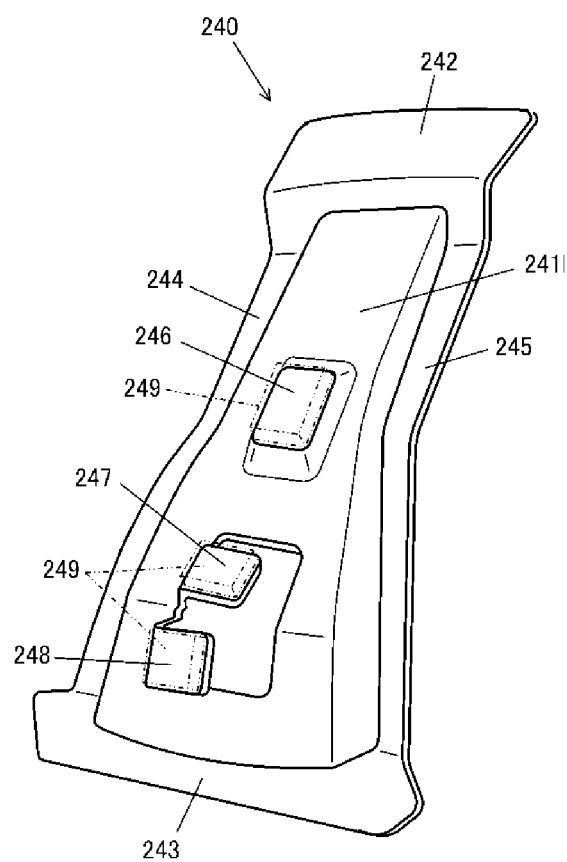
FIG. 39 is a perspective view of a reinforcing member according to the ninth embodiment.

As shown in FIG. 39, the suspension housing reinforcement 240 comprises a base face portion 241 which extends substantially along a vehicle-outside face of the rear pillar inner 232, first and second flange portions 242, 243 which are provided at upper and lower end portions of the base face portion 241 and joined to the rear pillar reinforcement 234 and the rear wheel house 231 respectively, and third and fourth flange portions 244, 245 which are provided at both-side end portions of the base face portion 241 and joined to the rear pillar inner 232. Further, a first seat portion 246 which protrudes toward the vehicle-outside is formed at an upper portion of the base face portion 241, and second and third seat portions 247, 248 which stand up toward the vehicle outside are formed at a lower portion of the base face portion 241. Viscoelastic members 249 . . . 249 are disposed at these seat portions 246, 247, 248 respectively.

The flange portions 242, 243, 244, 245 of the suspension housing reinforcement 240 are joined to respective rear faces of the rear pillar reinforcement 234, the rear wheel house 231 and the rear pillar inner 232. Viscoelastic member 249 . . . 249 are disposed at the first through third seat portions 246, 247, 248 of the suspension housing reinforcement 240. Then, the viscoelastic member 249 . . . 249 are pressed in a state in which one-side faces of these elastic members are made adhere, and the side frame outer 235 is overlapped from the vehicle-outside so that the other-side faces of these elastic members are made adhere. Consequently, the side frame outer 235 is joined to the rear pillar reinforcement 234 and the rear wheel house 231.

Thus, the suspension housing reinforcement 240 is arranged in the closed-section portion 236 which is formed by the side frame outer 235, the rear pillar inner 232, and the rear wheel house 231, which form an upper portion above the rear wheel house 231. Herein, the spot welding portions of the first through fourth flange portions 242 through 245 of the suspension housing reinforcement 240 to the rear pillar reinforcement 234, the rear wheel house 231 and the rear pillar inner 232 constitute the rigid joint portion X . . . X, and the joint portion of the base face portion 241 to the side frame outer 235 via the viscoelastic members 249 . . . 249 constitute the flexible joint portions Y, Y.

Thus, according to the ninth embodiment, the rigidity of the portion above the rear wheel house 231 can be improved, and the vibration at this portion above the rear wheel house can be damped by the flexible joint portions Y, Y.

The present invention should not be limited to the above-described embodiments, and any other further modifications or improvements may be applied within the scope of a sprit of the present invention. For example, while the relatively-thick viscoelastic members are applied in the above-described embodiments, a relatively-thin sheet-shaped viscoelastic member may be used or coated on the flange portions of the reinforcing members and the like.

What is claimed is:

1. A vehicle-body structure of a vehicle, comprising:
a frame having a closed-section portion which is formed substantially in a rectangular shape and extends in a longitudinal direction of the frame; and
a bulkhead comprising a partition face portion and plural joint flange portions provided at a periphery of the partition face portion, the bulkhead being provided in the closed-section portion of the frame such that the partition face portion thereof expands substantially in a perpendicular direction to the longitudinal direction of the frame and the plural joint flange portions thereof are joined to an inner face of the frame,
wherein
said joint flange portions of the bulkhead include a first flange portion which is provided along one side of the substantially-rectangular-shaped closed-section portion of the frame and a second flange portion which is provided along another side of the substantially-rectangular-shaped closed-section portion which is positioned oppositely to said one side of the substantially-rectangular-shaped closed-section portion of the frame, the first and second flange portions being configured to extend from end portions of the said partition face portion in opposite directions relative to each other along the longitudinal direction of the frame, and
one of said first and second flange portions is joined to the inner face of the frame via a damping member provided therebetween, and the other of the first and second flange portions is joined rigidly to the inner face of the frame with a direct contact, without any damping member.

2. The vehicle-body structure of a vehicle of claim 1, wherein said bulkhead further comprises of an additional partition face portion which is configured to extend from a tip of said other of the first and second flange portions or a central portion of said partition face portion substantially in parallel to said partition face portion so as to partition said closed-section portion of the frame, and a tip of said additional partition portion has an additional flange portion other than said first and second flange portions, which is joined to the inner face of the frame via another damping member provided therebetween.

3. The vehicle-body structure of a vehicle of claim 1, wherein said closed-section portion of the frame is comprised of two vehicle-body forming members.

4. The vehicle-body structure of a vehicle of claim 1, wherein said damping member is comprised of plural damping members which are disposed apart from each other along said one side of the substantially-rectangular-shaped closed-section portion of the frame.

5. The vehicle-body structure of a vehicle of claim 1, wherein said frame is a front side frame of the vehicle which extends in a vehicle longitudinal direction and to which a suspension cross member of the vehicle which extends in a vehicle width direction is connected via a bracket, said bulkhead is provided in the vicinity of a connection portion of the frame and the bracket such that said one of the first and second flange portions equipped with the damping member is located on an outward side, in the vehicle width direction, in the frame.

* * * * *